(12) United States Patent
Neilson et al.

(10) Patent No.: US 11,422,872 B2
(45) Date of Patent: Aug. 23, 2022

(54) LOCK-FREE METHOD OF TRANSMITTING HIERARCHICAL COLLECTIONS THROUGH SHARED MEMORY

(71) Applicant: Arista Networks, Inc., Santa Clara, CA (US)

(72) Inventors: Christopher Elisha Neilson, Vancouver (CA); Duncan Stuart Ritchie, Bowen Island (CA); Sebastian Sapa, Vancouver (CA)

(73) Assignee: ARISTA NETWORKS, INC., Santa Clara, CA (US)

( * ) Notice: Subject to any disclaimer, the term of this patent is extended or adjusted under 35 U.S.C. 154(b) by 287 days.

(21) Appl. No.: 16/886,692

(22) Filed: May 28, 2020

(65) Prior Publication Data
US 2021/0373982 A1    Dec. 2, 2021

(51) Int. Cl.
| | |
|---|---|
| *G06F 9/54* | (2006.01) |
| *G06F 12/0811* | (2016.01) |
| *G06F 9/50* | (2006.01) |
| *G06F 12/0831* | (2016.01) |
| *G06F 16/22* | (2019.01) |
| *H04L 45/021* | (2022.01) |
| *G06F 16/23* | (2019.01) |

(52) U.S. Cl.
CPC ............ *G06F 9/544* (2013.01); *G06F 9/5016* (2013.01); *G06F 9/5022* (2013.01); *G06F 9/542* (2013.01); *G06F 9/546* (2013.01); *G06F 12/0811* (2013.01); *G06F 12/0833* (2013.01); *G06F 16/2246* (2019.01); *G06F 16/2329* (2019.01); *H04L 45/021* (2013.01)

(58) Field of Classification Search
None
See application file for complete search history.

(56) References Cited

U.S. PATENT DOCUMENTS

| | | | |
|---|---|---|---|
| 6,282,589 B1 * | 8/2001 | Porterfield | ............ G06F 13/404 710/52 |
| 6,345,276 B1 * | 2/2002 | Lee | ...................... G06F 12/0223 709/215 |
| 8,051,227 B1 * | 11/2011 | Gewirtz | .................... G06F 9/52 711/146 |

(Continued)

*Primary Examiner* — Qing Chen
(74) *Attorney, Agent, or Firm* — Fountainhead Law Group P.C.

(57) ABSTRACT

Systems and methods for creating a new entry in a hierarchical state data structure with object entries is disclosed. The method includes allocating a shared memory buffer for a new entry in a shared memory. A request to create the new entry for a child object in a hierarchical state data structure in the shared memory is received. The new entry is to span at least one shared memory buffer uniquely identifiable in a location of the shared memory. The child object is a logical representation of a state of a system. In response to a request for an allocation of a shared memory buffer within a region of the shared memory for the new entry, a location identifier corresponding to a location of a parent entry holding a parent object to the child object in the hierarchical state data structure of an allocated region is received. The child object is created in the shared memory buffer for the new entry, and the new entry is available for concurrent access by one or more readers of the shared memory.

20 Claims, 23 Drawing Sheets

(56) References Cited

U.S. PATENT DOCUMENTS

| | | | |
|---|---|---|---|
| 2014/0172916 A1* | 6/2014 | Vermette | G06F 16/10 707/781 |
| 2014/0337593 A1* | 11/2014 | Holbrook | G06F 3/0638 711/162 |
| 2014/0359232 A1* | 12/2014 | Holbrook | G06F 16/2308 711/147 |
| 2016/0124889 A1* | 5/2016 | Singh | G06F 5/14 710/310 |
| 2016/0253098 A1 | 9/2016 | Holbrook et al. | |
| 2020/0104196 A1 | 4/2020 | Ritchie et al. | |

* cited by examiner

LOCK-FREE METHOD OF TRANSMITTING HIERARCHICAL COLLECTIONS THROUGH SHARED MEMORY

BACKGROUND

The present disclosure relates to shared memory management.

BRIEF DESCRIPTION OF THE DRAWINGS

Various objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
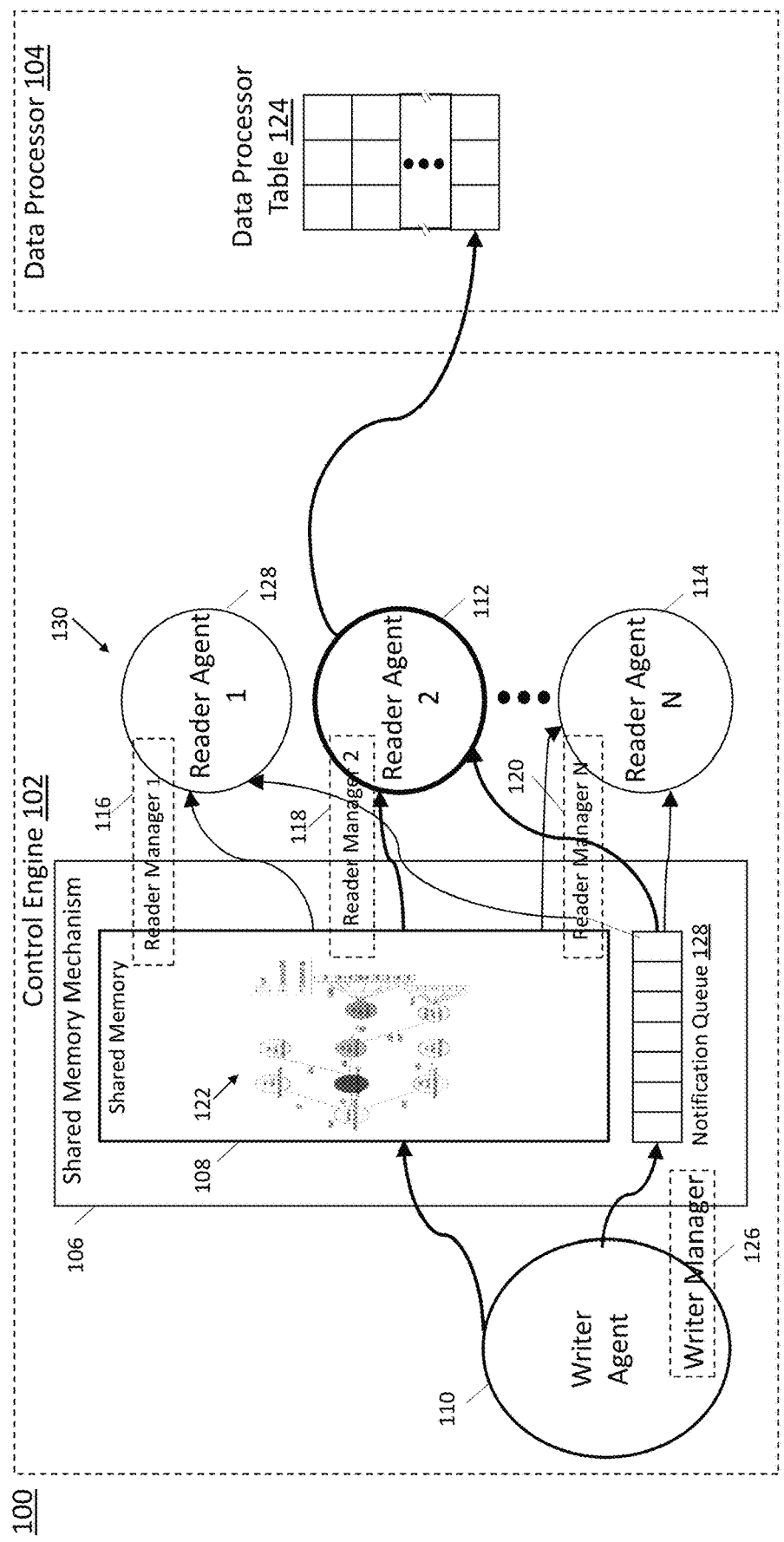
FIG. 1 shows an illustrative diagram of a hierarchical state sharing system 100, in accordance with some embodiments of the disclosure.

Certain technology applications require formidable technology infrastructure. Generally, the greater the growth of a technological field, the greater the requisite underlying support system. Internet-based technology applications are no exception to this generality, having chartered unparalleled growth in a mere multi-decade life span, their reach increasingly spans scaled outcomes. The fields of automation and entertainment owe their exceptional success at least in part to robust network appliance backbone support structures. Online order processing and robotics automation, analogous to their network system counterpart, are examples of real time internet-based applications with massive and rapidly dynamic scaled states, all requiring performance efficient yet resource conscious state sharing storage processes and mechanisms.

Figuratively speaking, the number of moving parts in a system generally dictates the system's states dynamics because a state change is reflective of a corresponding moving part(s) status. An example follows. In an internet-based scaled integration application, a warehouse of goods equipped with online procurement mechanisms, centralized or not, is part of an intricate platform of moving parts for receiving product purchase requests, sorting through, and processing the requests to ultimately retrieve and ship the products specified by the product requests, on a massive scale. To realize better profitability gains, products may be warehouse-sorted based on various product attributes, such as product type (e.g., household, non-household), product characteristics (e.g., perishable, non-perishable), and product sourcing (e.g., domestic, non-domestic). For example, products of a similar product type may be located in a special common warehouse area for order procurement efficiency, products of a similar temperature control requirement may be located in a special common warehouse area for product longevity, and products of a similar product expiration date range may be located in a special common warehouse area for product distribution efficiency. Accordingly, maintaining current states of various system attributes can be valuable to improving system performance.

Product attribute states may be represented by a hierarchy of state data structures of entries, object entries, or a combination thereof, of a shared memory with each object entry representing a product attribute state, for example, in a referential or non-referential and state-based memory configuration of a shared memory mechanism. Analogously, a hierarchical state data structure of object entries may represent states of packet data-carrying network routes established, de-established, and changed by a corresponding network system based on distinct route attributes or metrics, such as open systems interconnection (OSI) model layers, protocol types, and status. Product and route attributes, dynamic features as they each are, may be respectively represented by states of a reliably configured shared memory with mechanisms in place for concurrent and asynchronous access by writer and reader agents enjoying a lock-free and wait-less memory processing experience. Such system states sharing representations, however, must support large-scale and growing systems integration. In some embodiments of the disclosure, as later discussed herein, hierarchical state data structures, an example of which are hierarchical state trees may be configured as hierarchy of objects, non-objects, or a combination thereof.

One approach to state-based memory configuration and management is a centralized (e.g., database) memory system model where a writer (producer) of contents produces states in its local memory (or storage), sends serialized data over a socket, for example, to a process manager positioned on the receiving side of the serialized data. The process manager reads the received serialized data from the socket and writes the received serialized data to the centralized database. The process manager then writes the read serialized data from the centralized database to corresponding sockets of the database-subscribing reader processes for consumption. The reader, one of the database-subscribing consumers, may read the serialized data from its respective sockets and process the serialized data for ultimate consumption by the respective reader (local memory) consumers. The problem with this approach is performance, scaling, and memory resource constraints. With every state change, an entire process of states requires re-copying, accordingly, the rapid growth of processes (X, in number) leads to processing speed impairments (1/X), at times contributing to a failed network state. Multiple copies of the same data set are required. For example, an original agent maintains a copy of a dataset in its local address space, pushes the state of the centralized memory and stores another copy of the same dataset in each of the reader agent local address spaces of readers monitoring for changed states, all in an effort to recover the writer's own state, should the need arise. Dataset copying requirements often make for unreasonable memory resource demands, pushing the physical boundaries of the system, at times, to their outer brinks. Yet another drawback of socket-based centralized memory system approach is the possibility of overload. State change notifications cannot be coalesced in the system socket and can cause system overload particularly in situations of heavy and fast state-representing entry modifications. A system socket overload can lead to system failure. System unreliability and memory resource constraints can become gating items to scaled growth.

A faster, more scalable shared memory configuration approach, single-level hierarchical-based, is another option. Content producers (writers) generally write state-representing data to the shared memory for state sharing. Readers, consumers of the written data, generally monitor the shared memory for data of interest and when written, consume but generally do not modify the written data. But the single-level hierarchy approach has faced limitations of its own. In some systems, data is stored almost exclusively in the form of key-value pairs with hash table mapping underpinnings. Writing into a data collection of commonly-accessed shared data structures requires retrieving the value in the key-value pair with the use of a corresponding key. Using the same key, the reader is then notified of a changed shared memory state but remains unaware of the particular change, which is retrievable only with the same key. While growth accommodating, scaling comes at a cumulative cost of hash table management complexity and at times memory scarcity. Because data can only be stored in the form of key-value pairs, the requisite collection of hash tables and related mappings can give rise to undue design complexity.

Taking the example of a networking virtual routing and forwarding (VRF), a collection of hardware programmable networking routes, the foregoing single-level shared state memory structure approach requires generating an instance of each hash table for each set of routes in a VRF. In early networking designs, a network element, such as a network router, included one routing table, essentially one VRF. But with rapid growth of networking demands, VRFs soon scaled to 8, 16, and more recently over 1000. Each VRF may contain any number of routes, indeed, at a high scale, the number of routes in a VRF can grow to millions. A network design of 1,000 VRFs and growing requires building and storing at least 1,000 instances of each hash table just to meet current VRF size status quo requirements. While memory management designs with or without limited numbers of hash tables are near non-starters in most practical state shared memory applications, an all-encompassing hash table design has an inherent resource draining characteristic. Accordingly, current shared memory designs, limited to a one-level hierarchy, suffer from burdensome and unnecessary overhead and housekeeping chores to meet their rigorous table management and maintenance demands. But problems do not stop there.

In some current hierarchical designs, transmitting information to other processes is done with different data formats, a memory-exhaustive, cumbersome, and inefficient process. For example, a local copy of the dataset may be stored in hierarchical form in one instance but requiring conversion to a flattened non-hierarchical form before meeting the transmission requirements of temporally subsequent processes that may in turn require unflattening of the dataset back to hierarchical form for local storage. Accordingly, despite benefiting from scaling and improved memory resource management features, nevertheless, the one-level hierarchy shared memory model approach lacks the sophistication of a scalable yet memory space conscious, concurrency-promoting, and high-functioning state sharing memory configuration.

A hierarchical format, true to form, can be a natural way for data to be stored. Some embodiments of the present disclosure enable a multi-level hierarchical shared memory approach that avoids some of the pitfalls of the above-noted conventional approaches. In accordance with some embodiments of the disclosure, a multi-level hierarchy data structure represents shared states of a system via a shared memory architecture. In some embodiments, data may be transmitted with greater speeds allowing all processes to operate at their individual respective speeds without regard to remaining processes. Additionally, datasets of various disclosed shared memory management mechanisms allow for ease and convenience of program code development by removing the burdens associated with complicated hash table manipulations.

A system, such as some of the disclosed embodiments, providing for a natural hierarchy of data collections of a state shared memory data structure in large part settles the above-identified issues of current approaches. The shared memory-based approaches of various example embodiments impose a level of system architecture sophistication allowing for concurrent reader-consumers independent access to written data. The writer-producer and multiple reader-consumer agents of various embodiments disclosed herein, despite their numbers, have limited memory requirements and act independently and autonomously relative to one another. The writer writes data at its distinct natural speed and the readers read the written data at their respective distinct natural speeds, and they do so concurrently with the writer. Objects can be managed by any number of allocators, with arbitrary specialization for writer-side and reader-side operations, for example.

In some embodiments, a writer of a multi-level hierarchy-based shared memory mechanism communicates state changes reflective of system state attributes, represented by object instances organized in a hierarchy state tree to the shared memory mechanism. A hierarchical state tree may include one or more hierarchical collections of objects with each object—a parent object—including one or more attributes or sub-objects—a child object. In some embodiments, the shared memory comprises a collection of shared memory buffers and an object instance may span one or more shared memory buffers of the shared memory. The system is memory resourceful and scales nearly indefinitely, restricted only by potential system memory size constraints.

A writer agent (or "writer") may report a process state change to the shared memory of the shared memory mechanism while one or more reader agents (or "readers") may take concurrent or singular note of the reported process state change (or current states). In some embodiments, a reader agent crawls a notification queue monitoring for writer-initiated state change announcements, deciding to report the announcements to interested clients, or not, or to simply take note of the announcements. Each writer and reader agent may simultaneously perform a respective task on the shared memory, at a respective, distinct, and naturally qualifying pace without regard to the pace of the other(s).

In some embodiments, through the guidance of the writer agent, a writer manager instance, when executing, can take hold as a conduit to the shared memory for allocating and deallocating object entry memory spaces. The writer manager instance may be a program that when executed oversees the general health and operation of the shared memory and assists the writer agent in announcing object-based state changes. For example, the writer manager may place notifications in the notification queue of the shared memory to: announce shared memory-represented states to readers; report object entry status to readers; report certain activity, or lack thereof, for the benefit of counterpart and monitoring reader managers; and control object status indicators. In some cases, the writer agent may single-handedly, in the absence of the writer manager, perform the above-noted tasks, i.e. allocate and deallocate memory, manage the health and operation of the shared memory, and announce object-based state changes.

In some embodiments, a shared memory data structure is organized into a near limitless number of hierarchical state tree object instances representing current system states, at scale. In some cases, an object may have one or more corresponding objects or object collections that in turn may have one or more corresponding objects or object collections. Some object collections may include mutable objects, and some may not, some may include reference-based objects, and some may not. In all cases, the system achieves high-performing, scaled, space-conscious state sharing outcomes and does so with the supplemental benefit of efficiency. Some embodiments accommodate multiple, concurrent, independent, lock-free and wait-less read and write processes.

Unlike its predecessor architectures, the shared memory approach of the various disclosed embodiments of the disclosure is free to grow on a massive scale while like its predecessor architectures, it continues to maintain data-reliability and referential integrity. In various disclosed embodiments, memory resources are stingily utilized by deploying clever hierarchical-based addressing schemes. A group of tables, generally local to the reader agent, assure reader data integrity and a shared memory hierarchical-based addressing scheme offers performance and memory efficiency. The writer gives the reader indications of the hierarchy object locations of possible state-changed attributes in the shared memory. The indications lead the reader to find the actual location of the potentially affected hierarchy objects but only after implementing certain data integrity precautionary measures. The indications are coalesced such that the total number of indications are bounded by the number of state-changed attributes in the shared memory, providing resilience against system overload. In some cases, the reader's work is made more efficient by determining to not process certain coalesced notifications, essentially, dropping the notification and proceeding to the next notification. For example, a notification may be dropped because it is benign, referring to a deleted system state, a state of which the reader has not previously learned. These and other memory resource conservation and performance driven features help meet the requirements of large-scale states-based systems integration, such as, without limitation, for online ordering platforms and networking processes, while avoiding complex design intricacies imposed by key-value pair encompassing designs, for example. Further details of notification coalescing are provided in US Patent Publication Application No. 2016/0253098, entitled "System and Method of a Shared Memory Hash Table with Notifications", filed on May 11, 2016, and filed by Hollbrook et al., which is incorporated herein by reference as though set forth in full.

The system provides a natural hierarchy to the data collection. In some embodiments, a writer of a shared memory hierarchical state tree communicates state changes of selectable system attributes on the basis of hierarchical levels of the state tree with reliability by implementing smart addressing schemes in concert with the reader's use of reader tables and version control. The immutable character of some objects supports faster reader operations by eliminating wasteful processes irrelevant to reader clients and instead promotes focus on reader relevant tasks.

Certain immutable object characteristics grant the reader the ability to infer certain writer actions, communicated through writer-initiated notifications of the notification queue. In some cases, the notification queue is saved in the shared memory for efficiency. The reader process, on behalf of interested client processes, monitors for shared memory state notifications and based on indications in the notifications, in combination with the use of the smart, well-maintained, reader tables, rapidly and precisely determines a corresponding location of the affected object in the shared memory space. In some cases, a next reader action, as determined by the next writer manager notification, may lead the reader to take no further action, not even to process the current notification, instead the reader determines to proceed to the next notification.

In accordance with various disclosed embodiments, a method for creating a new entry in a hierarchical state tree of state-representing object entries is disclosed. The method includes a writer manager allocating a shared memory buffer for a new entry in a shared memory. The writer manager receives a request to create the new entry for a child object in a hierarchical state data structure in the shared memory. The new entry comprises one or more shared memory buffers and is at a uniquely identifiable location in the shared memory. The child object is a logical representation of a state of a system. In response to a request for an allocation of a shared memory buffer within a region of the shared memory for the new entry, the writer manager receives a location identifier corresponding to a location of a parent entry holding a parent object to the child object in the hierarchical state data structure of an allocated region. The child object is created in the shared memory buffer for the new entry, and the new entry is available for concurrent access to one or more readers of the shared memory.

In accordance with various disclosed embodiments, a method for processing an entry of an object in a shared memory is disclosed. A notification from a notification queue of the shared memory is read by a reader of the shared memory. The notification represents a change made by a writer manager to a state change in a state of the entry of the object in a hierarchical state data structure in the shared memory. The entry of the object is a logical representation of the state of a system. Based on a location identifier of the notification from the notification queue, an entry status corresponding to a status of the entry of the object is located in the shared memory. The location identifier identifies a location of the entry to the object in the hierarchical state data structure. Based on the entry status, a determination is made as whether or not the entry of the object is a valid state of the object. In response to determining the entry of the object is a valid state of the object, another determination is made as to whether or not to store a copy of the object in a reader entry of a reader local storage of a reader. The reader entry corresponds to a reader object of a reader hierarchical state data structure in the reader local storage. The reader object is in a position in the reader hierarchical state data structure corresponding to a like position of the object in the hierarchical state data structure, and the reader hierarchical state data structure is a copy of the hierarchical state data structure in the shared memory.

In accordance with various disclosed embodiments, a method for managing a hierarchical state data structure in a shared memory is disclosed. A writer of the shared memory allocates one or more shared memory buffers of the shared memory. The shared memory buffers are used for storing system states of a multi-level hierarchical state data structure, and the multi-level hierarchical state data structure is organized into objects of logical representations of the system states. The shared memory buffers are updated in response to changes to the system states of the multi-level hierarchical state data structure. One or more readers of the shared memory access the multi-level hierarchical system data structure in the shared memory concurrently relative to one another and concurrently relative to the writer. An object of an entry is created in the multi-level hierarchical state data structure and a notification of an allocated shared memory buffer for the entry is stored in a notification queue of the shared memory. The storing of the notification in the notification queue causes the one or more readers to be alerted of a modification, addition to, or deletion of the entry. The writer removes the object from the multi-level hierarchical system data structure and deallocates the allocated shared memory buffer in response to deletion of the entry from the multi-level hierarchical state data structure.

In some cases, but not all, the object is a child object. In some scenarios, the object may instead be a root of the hierarchical state tree or it may be a parent object of a corresponding child object. Regardless, in some cases, all objects, other than a root object, of a hierarchical state tree stem from and are children or descendants (grandchildren, great grandchildren, . . . ) of the root object. In scenarios where the object is a child object, the parent location identifier may be a part of the corresponding child object entry header or metadata field. For example, in response to an allocation of an allocatable region of the shared memory for an object entry, a payload may be returned with a metadata field-inserted parent location identifier for linking the object to its parent object. The parent location identifier can direct targeting of child object entry processing with use of a correct corresponding parent object during the lifetime of the child object. In an application, for example, where each parent has its own processing state machine and by virtue of the child entry including its parent location, when acting on the entry, the reader can direct the entry processing to the correct parent. A robust data version integrity feature ensures reader and writer concurrency. For example, a current version number in the metadata field of the object entry, provided by the writer, may be verified against a version number at a subsequent time during each subsequent read operation to determine the validity of the entry data before the entry data is determined ready for reader processing.

To avoid buffered entries, some memory operations are facilitated by a unique addressing scheme, additionally offering high performance and memory conserving features. The addressing scheme is supported by a cleverly designed hierarchy object rule—the reader learns of parent objects before learning of corresponding child objects. For similar reasons, child objects are removed in accordance with a countering rule—a child object is removed prior to the removal of its corresponding parent object. Removal of a child object or entries thereof is an event superseding notification of the removal. In some cases, parent objects of corresponding child objects are also notified when object entries are deleted from the hierarchy. For some object removal, the associated entry may not be removed until a predetermined reference count value is reached, i.e., a predetermined number of references to the object are removed.

Regions in the shared memory space are fluid, dynamically created, allocated, and deallocated in the shared memory on an as-needed basis. For example, in some embodiments, a Linux kernel request may be made for a large chunk of shared memory space to be allocated on a shared memory region basis. A region of the allocated chunks may be allocated in response to a new object entry, for example. Alternatively, an on-demand Linux kernel request may be made for every client allocation request but at the possible cost of efficiency. Shared memory buffers may be repurposed. The same shared memory buffer may be allocated for a child object at one point in time, allocated for a parent object at a future point in time, allocated to a child object at yet another subsequent point in time.

In some embodiments, a root of a hierarchy state tree resides in a memory space known to itself and to some or all remaining hierarchy state tree objects by virtue of a reference pointer to the root location. The root location is a known location to the writer to help keep track of the root for object processing such as object deletions.

In some embodiments, the system stores a writer manager reference in a metadata field of an object. The writer manager reference identifies a location of a writer manager in a local memory (or storage) to the writer, residing externally to the shared memory for fast access and independent verification. As earlier noted, a writer manager, when executed, may manage a corresponding hierarchical state tree in the shared memory. That is, in some embodiments, each hierarchical state tree has a corresponding writer manager, similarly, each hierarchical state tree, accessible to a reader, has a corresponding reader manager.

As a last object entry creation measure, the system stores a location identifier for the created object in the shared memory notification queue, the act of which serves as notice to the shared memory readers of a possible changed state in the hierarchical state tree by identification of the location identifier determinative of the location of the new object entry in the shared memory.

In some embodiments, notifications may be added, removed, or modified by virtue of a notification coalescing feature, allowing readers to catch up with learning, for example, an initial shared memory state, while maintaining the guarantee that a reader processing the queue will eventually reach a consistent state relative to the shared memory.

The reader manager of a reader process, when executed, takes responsibility for managing the reader hierarchical state tree, for example, by processing notifications placed in the notification queue by a writer process. In some embodiments, the reader manager builds a local copy of the states in a corresponding local memory hierarchical state tree based on its learnings from announced notifications and mirrors building of the hierarchy states tree in the shared memory in its reader local storage. Consequently, a client program code, in execution, is in a position to perform functions such as lookups or to iterate on the reader local hierarchical tree as if the hierarchical tree was owned by the reader agent rather than the writer agent.

In some embodiments, a reader infers a state change by leveraging the immutability of certain objects. For example, in a scenario where a reader picks up a notification for a previously notified object—an object with a copy currently local to the reader—the reader may infer that the object has been deleted from a corresponding hierarchical state tree.

As a reader learns of an object in shared memory, through the notification queue, the reader implements certain protocols to copy the object entry for purposes of data integrity. The reader further creates and maintains a local copy of that object and inserts the object into its proper hierarchy location in its local hierarchy state tree and then updates all local location mapping tables to make sense of the data at a subsequent notification time. Similarly, for object deletions, the reader starts processing a corresponding notification from the notification queue and may remove the object from its local hierarchy, update relevant local tables and subsequently notify its clients of the object deletion.

The shared memory may be persistent. The hierarchy states remain intact in the shared memory in the event of a writer process malfunction or restart, allowing the writer to resume where the writer left off prior to when the writer restarted while readers of the shared memory continue operating before, during and after the writer restart without interruption and at times, ignorant of the writer restart. In some embodiments, the shared memory may be maintained in persistent non-volatile memory as a further state preservation measure to maintain the shared memory contents in the face of a system power-down or power-loss. For example, in the above networking example, a network element, as a network switch, may be restarted, powered-off and then powered back on, nevertheless, the shared memory contents remain preserved the entire time.

In some cases, the reader takes certain precautionary measures, for example, to verify the correct parent object to a corresponding child object and the correct object to a corresponding hierarchy tree prior to effecting changes to its own copy of the hierarchy tree based on notifications from the notification queue. The reader may make certain inferences based on certain unique features and design characteristics. For example, the immutability of certain objects enables the reader to pass on certain notifications or to instead learn of a new object. Objects that have an immutable characteristic may not be simple objects and are typically reference-counted objects with a corresponding writer manager pointer, whereas, simple objects typically do not have an associated writer manager reference in their corresponding metadata field and have no child objects, as will be further discussed below relative to FIG. 7.

In some embodiments, a writer to the shared memory may serve as reader for another process to the shared memory and a reader to the shared memory may serve as a writer to another process to the shared memory, a feature supported, at least in part, by the fluidity of writer and reader managers. But no more than one writer can be a writer to a given shared memory at any given time to avoid conflicting and erroneous object entry processing.

In various illustrated embodiments and related descriptions, a method of transmitting one or more hierarchical state data structures through a shared memory accessible to a producer writer and consuming readers is disclosed. FIG. 1 shows an illustrative diagram of a multi-level hierarchical state sharing system. In FIG. 1, a multi-level hierarchical state sharing system 100 is shown to include a control engine 102 and a data processor 104, in accordance with an embodiment of the disclosure. Control engine 102 is shown to include a shared memory mechanism 106, a writer agent 110, and reader agents 130 (reader agent 1 128, reader agent 2 112 through reader agent N 114, "N" representing an integer value). Data processor 104 is shown to include data processor table 124. Writer agent 110 is shown to include writer manager 126, each of reader agents 1, 2, through N is shown to include a reader manager, e.g., reader manager 1 116, reader manager 2 118, and reader manager N 120, respectively. Shared memory mechanism 106 is shown to include shared memory 108 and notification queue 128. In some embodiments, shared memory 108 is comprised of shared memory buffers that may be allocated, in random or structured order, to object entries of hierarchical state data structure 122. Shared memory 108 is shown to include hierarchical state data structure 122.

In some embodiments, writer agent 110 and/or writer manager 126 may be, in part or in whole, incorporated into the shared memory portion of shared memory mechanism 106. It is understood that while writer manager 126 is shown and discussed herein as a part of writer agent 110, writer manager 126 may be, in whole or in part, incorporated into the non-shared memory portions of shared memory mechanism 106. For example, writer manager 126 may be situated, in part or in whole, in shared memory mechanism 106 but externally to shared memory 108. Similarly, each of reader managers 1-N ("N" representing an integer value) may similarly be incorporated, in part or in whole, into a corresponding reader agent, i.e. reader agents 1-N, respectively. Like the writer manager, each of the reader managers 1-N may span across a corresponding reader agent and non-sharing memory portions of shared memory mechanism 106. The reader manager may be alternatively located, in whole or in part, in shared memory mechanism 106. In the embodiment of FIG. 1, each reader agent 1-N is shown with a corresponding reader manager 1-N, respectively. In some embodiments, a reader agent may not necessarily have a corresponding reader manager, as will be discussed below. Notification queue 128 may be stored in non-shared memory portions of shared memory mechanism 106 and includes notifications deposited by writer manager 126 and read by one or more of the reader managers 1-N.

Shared memory mechanism 106 may include hardware, software, or a combination of both not shown in FIG. 1. For example, shared memory mechanism 106 may include circuitry or software code executing on a processor for controlling various operations performed on the hierarchical state data structure 122 of shared memory 108. In some embodiments, hierarchical state data structure 122 includes one or more collections of entries, each entry including an object (or object instance) of a logical representation of a system state. A system state of an entry may describe an attribute or a characteristic of a system at any given time. With continued reference to the examples provided above, a system state may be based on a product characteristic of online ordering systems or a route attribute like a protocol in a networking environment. An object is generally a language object that may include one or more tables and/or one or more processes. An object may be of various types of objects, for example, an object may be a C++, Java, D, C#, and/or other types of language objects.

At least some of the collections of the hierarchical state data structure 122 are organized in a hierarchy fashion of objects entries. In some embodiment, hierarchical state data structure 122 may be a hierarchical state tree. In some embodiments, a multi-level hierarchical state data structure (e.g. hierarchical state data structures 122, 222, 422 (of FIGS. 1, 2, 4, respectively) and others disclosed herein) is a multi-level hierarchical state tree. The shared memory buffers of shared memory 108 may be used for storing system states of the multi-level hierarchical state data structure 122. The shared memory buffers of shared memory 108 may be updated in response to changes to the system states of hierarchical state data structure 122. In some embodiments, an entry spans a single shared memory buffer of shared memory 108, as in most described embodiments herein. Alternatively, an object entry may span more than one shared memory buffer of shared memory 108. An object entry may be value based, key-value based, or reference count based.

Writer agent 110 is a producer to shared memory 108 and each of reader agents 1-N are state consumers of shared memory 108. In some embodiments, writer agent 110 may operate on shared memory 108 concurrently while one or more of the reader agents 1-N consumes data from or simply monitors to shared memory 108. Similarly, one or more of the reader agents 1-N may read states from shared memory 108 concurrently relative to each other and relative to writer agent 110. In some embodiments, writer agent 110 is a process implemented by execution of program (software) code by one or more processors. Similarly, each of the reader agents 1-N may be a process implemented by execution of program code by one or more processors. Consistent with one of the reader agent processes, a reader agent, for example, reader agent 2, may read an entry (data) stored in shared memory 108 via a corresponding reader manager, for example, reader manager 112, and store the read data in a local buffer (not shown in FIG. 1). Reader agents 1-N are notified of new entries or updates to existing entries—modifications—and even entry deletions by notifications in notification queue 128 and perform read operations in a lock-free and wait-free fashion. While the writer modifies shared memory data, the readers may concurrently read shared memory data even if the data is only partially updated because the readers are also notified of certain object entry status telling of the readiness of a corresponding entry. Accordingly, shared memory 108 data may be independently accessed by the one or more readers without regard to writer agent 110 and without regard to the remaining shared memory reader agents. Similarly, notifications of notification queue 128 are telling of updates to and addition and removal of objects of the hierarchical state data structure 122 in shared memory 108.

In some embodiments, writer agent 110 may perform operations on data structures 122 through writer manager 126. For example, writer manager 126 may serve as a conduit from writer agent 110 to shared memory mechanism 106 for allocating and deallocating object entry memory spaces among other care taking operations as discussed herein.

In some embodiments, a set of program instructions executed by a child object can be the same or a different set of program instructions than the program instructions that are executed by a corresponding parent object. The relationship between the parent and child objects is reflected in hierarchical state data structure 122. In some embodiments, the relationship is cleverly embedded in the child object for efficient system performance as later discussed. Certain rules are set in place in connection with the child and parent objects, in part leveraging an immutable property of some of the hierarchy objects in some embodiments. A parent process may be a parent object that is a reference-counted data or a non-reference-counted data. Similarly, a child process may be a child object that is a reference-counted data or a non-reference-counted data. With continued reference to FIG. 1, data structure 122 includes at least one hierarchy level of parent-child objects. The hierarchy has a root from which sprawl various hierarchical levels of parent-child (grandchild, great grandchild, . . . ) objects, as further discussed below.

In some embodiments, data processor 104 executes one or more processes that may be different than the processes with which writer agent 110 and the reader agents 1-N are tasked. Any one of the reader agents 1-N may play the role of a writer agent to a shared memory of processor 104. For example, reader agent 2 112 may be a writer to data processor table 124.

Figure 2:
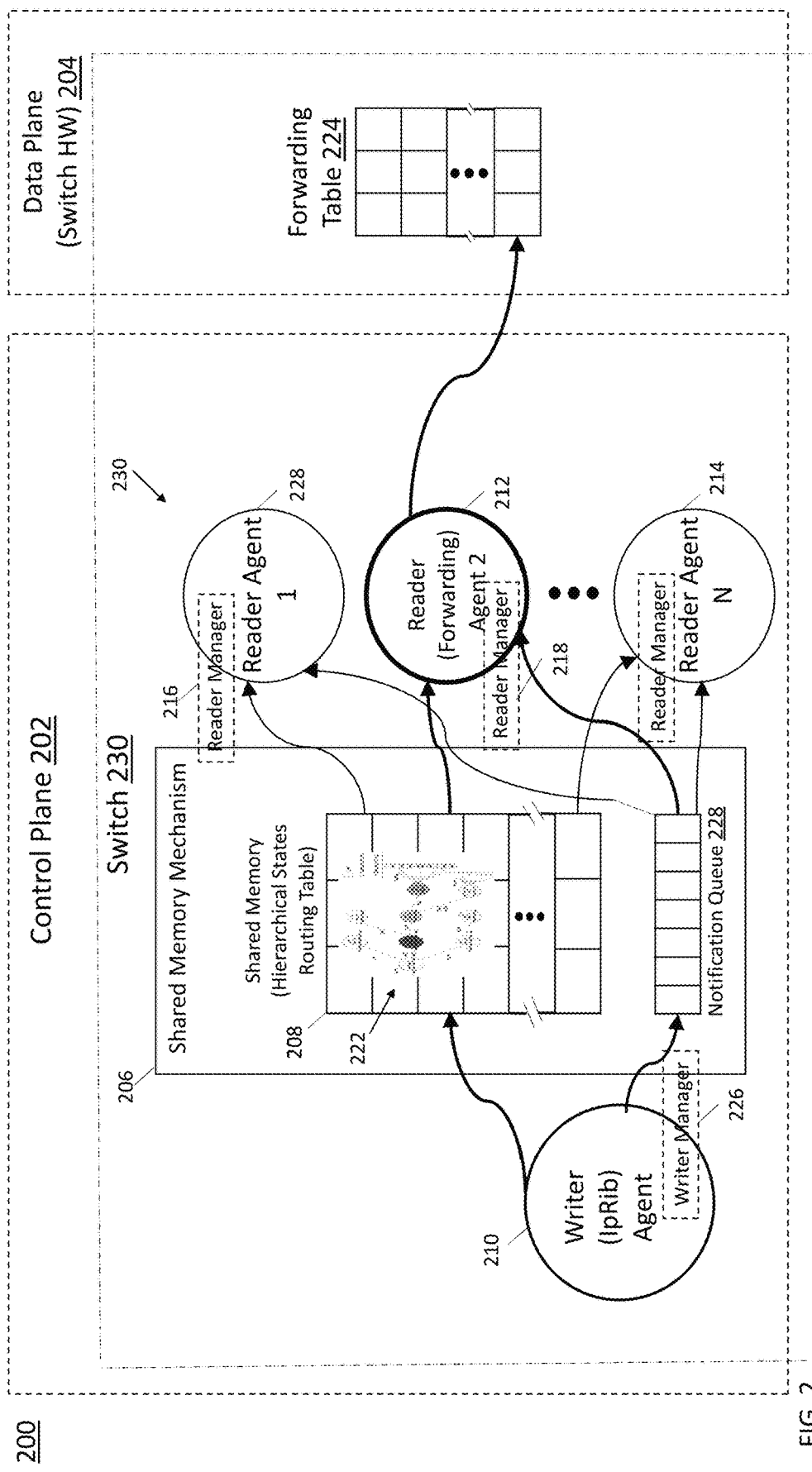
FIG. 2 shows an illustrative diagram of a hierarchical state sharing system 200, in accordance with some embodiments of the disclosure.

FIG. 2 shows an illustrative diagram of a multi-level hierarchical state sharing system. In FIG. 2, a multi-level hierarchical state sharing system 200 is disclosed in accordance with an embodiment of the disclosure. In some embodiments, system 200 is configured analogously to system 100 in a networking environment. In FIG. 2, system 200 is shown to include a control plane 202 and a data plane 204, in accordance with an embodiment of the disclosure. Control plane 202 is shown to include a shared memory mechanism 206, a writer agent 210, and reader agents 230 (reader agent 1 228, reader agent 2 212 through reader agent N 214, "N" representing an integer value). Data plane 204 is shown to include data forwarding table 224. Writer agent 210 is shown to include writer manager 226, each of reader agents 1, 2, through N is shown to include a reader manager, e.g., reader manager 1 216, reader manager 2 218, and reader manager N 214, respectively. Shared memory mechanism 206 is shown to include shared memory 208 and notification queue 228. In some embodiments, shared memory 208 is comprised of shared memory buffers that may be allocated, in random or structured order, to object entries of hierarchical state data structure 222. Shared memory 108 is shown to include hierarchical state data structure 222. In some embodiments, data structure 222 includes logical representations of states of routes of one or more routing tables in a multi-level hierarchical fashion. In some embodiments, control plane 202 and data plane 204 are a part of, coupled to, or incorporated, in part or in whole, in a network switch device, such as a switch 230 of FIG. 2. It is understood that control plane 202 and data plane 204 may be a part of, coupled to, incorporated, in part or in whole, in a different type of networking device, such as, without limitation, a network router or switch, or any network device with a shared memory configured to house system states of networking traffic or network topology characteristics.

Object instances may be created for various classes. In some embodiments, a chunk of memory is requested for allocation at a first allocation request and as memory is needed, a second allocation request is made for memory to be allocated from the allocated chunk. In a nonlimiting example, a region of shared memory 108 may be first requested for allocation by use of the Linux kernel. The region may be 128 kilo bytes (KB) of shared memory 108 space. Each time an entry is to be allocated; a second allocation request is made of the allocated region memory space. For example, the second allocation may be for a 64-byte size (new) entry from the 128 KB region. Either or both of the first and second allocation requests may be made by writer manager 126. In response to the second allocation request for the new entry, a currently unused 64-byte entry from the region is designated accordingly using flags of a metadata field of the entry. It is understood that other suitable methods for marking an allocated entry may be employed. In some embodiments, an entry is made of a metadata field, followed by a client payload field.

Figure 3:
FIG. 3 shows an illustrative diagram of an object entry structure of a hierarchical state sharing system 300, in accordance with some embodiments of the disclosure.

Upon allocation, at least some of the metadata field may be used to mark a successful allocation, but the payload field (entry data field or object instance) can be considered empty. A child object or a parent object, each a logical representation of a system state, may make up the entry data field of an entry. In an example embodiment, an object may be created with a class of three fields, a Vrf name, a specific Internet Protocol, and a specific routing protocol, (vrfName, internetProtocol, routingProtocol). An object, an instance of the class, is created as follows. Continuing with the 3-field class example, an example object instance may be <vrf-A, ipv4, OSPF> yet another object instance example may be <vrf-B, ipv6, RIP>. In some embodiments, when a child object is created in shared memory 108, {vrf-A, ipv4, ospf} data is stored in the payload field (or entry data field) of the entry that is newly allocated. In some embodiments, a parent location identifier is part of the metadata field of the new entry, in shared memory 108, linking a child object to a corresponding parent object. An example object entry structure of a corresponding entry of the above 3-field class example is provided in FIG. 3.

For example, writer agent 210 may be an IpRib agent for a border gateway protocol (BGP) process instantiating C++ type objects (e.g., objects of hierarchical state data structure 222) related to parent objects or a root object of hierarchical state data structure 222 of shared memory 208. For example, writer 210 may publish an object to hierarchy state data structure 222, keyed or referenced, and containing a string type name, and notify readers. Reader agent 2 212 reads the writer-generated notification, processes the notification based on the object type and other object-related information, and depending on the outcome of the reader notification processing, may choose to read, or not, the object entry from shared memory 208. An illustrative example and discussion thereof follow relative to FIG. 7. Similarly, any of the reader agents 1-N, through respective reader managers (e.g., reader agent 210 through reader manager 216, reader agent 212 through reader manager 218), may consume data from shared memory 208 and do so concurrently relative to the remaining reader agents and writer agent 210.

Reader managers, such as reader managers 1-N of FIGS. 1 and 2, are part of the reader process that is responsible for managing the hierarchical state data structure (e.g., hierarchical state data structures 122 and 222 of FIGS. 1 and 2, respectively). The reader manager processes a notification queue (e.g., notification queues 128 and 228 of FIGS. 1 and 2, respectively) and builds its own local copy of the shared memory hierarchy while the shared memory hierarchy is being built. Among other tasks, the reader manager may notify reader clients of state changes in the hierarchy, and the reader clients, through execution of program code, can perform searches and iteration into the local copy of the hierarchy. For expedited notification decoding, in some embodiments, a reader or reader manager may maintain local reader verification tables. For example, a first reader verification table may store associations of notifications-obtained locations of corresponding hierarchy locations in the shared memory and corresponding references to local reader-maintained locations of parent objects of a reader hierarchy local to the reader and mirroring the corresponding hierarchy in the shared memory. A second reader verification table may maintain associations of the notification locations for parent objects in the shared memory and corresponding references to the corresponding locally-maintained parent object (in the reader hierarchy). Yet a third reader verification table may maintain a table of associations opposite to that of the second verification table, i.e. associations of references to the corresponding locally-maintained parent object (in the reader hierarchy) and corresponding notification locations of parent objects in the mirroring hierarchy of the shared memory.

In some embodiments, as the reader manager processes the notification queue, the reader manager is guaranteed to learn about the parents in corresponding hierarchical states data structures prior to learning about their associated children. As the reader manager learns of an object in a hierarchical state data structure in shared memory, the reader manager can create a heap-local copy of the learned object and insert it into the proper location in the reader local hierarchical state data structure mirroring that of the shared memory and update relevant reader verification tables accordingly and subsequently notify reader clients. Similarly, for object deletions, the reader manager can destroy the reader local object (remove the object from the reader hierarchical state data structure), update the tables, and notify reader clients.

In general, a network device can include two different planes for processing network traffic, such as control plane 202 and data plane 204. In the embodiment of FIG. 2 where data plane 204 is a part of a network switch, such as switch 230, data plane 204 may house the hardware, circuits, or programmable hardware for switch 230. Data plane 204 includes forwarding table 224 for maintaining routing information for network routes. In some embodiments, forwarding table may be organized in a multi-level hierarchical state data structure, such as data structure 222, with a reader agent as a data producer of the hierarchy, as previously discussed.

In accordance with an exemplary application of the embodiment of FIG. 2 to networking environments, data plane 204 may receive, process, and forward network traffic using various configuration data (e.g., forwarding, security, quality of service (QoS), and other network traffic processing information). For example, for each received packet of the network traffic, data plane 204 may determine a destination address of that packet, search for the requisite information for that destination in one or more tables stored in the data plane, such as table 224, and forward the packet through the proper outgoing interface, as prescribed by table 224, for example. Control plane 202 may gather the configuration data from different sources (e.g., locally stored configuration data, via a command line interface, or other management channel such as Simple Network Management Protocol (SNMP)) and may configure data plane 204 using the configuration data.

In some embodiments, control plane 202 may gather configuration data or information related to but not the actual data from one or more sources and configures data plane 204 using the information. Control plane 202 may store the configuration data or related information in the shared memory buffers of shared memory 208. Data plane 204 or control plane 202 may be a process utilizing state change information from one or more of the reader agents 1-N. For example, a reader agent (e.g., reader forwarding agent 212) may serve as a writer agent to the process of data plane 202 and write to, update, or delete information in forwarding table 224 accordingly. Each or both include multiple different hardware engines (not shown in FIG. 2). Each of the engines may use the information related to data from control plane 202 to operate on the hierarchical state data structure 222 of shared memory 208 of shared memory mechanism 206.

In addition, control plane 202 may store the configuration data in one or more tables. For example, the network device stores the routing information in a routing table, such as the routing table of shared memory 208, for processing affecting data plane 204, for example, by reader forwarding agent 2 112. Data plane 204 can further include multiple different hardware forwarding engines (not shown in FIG. 1). Each of these hardware forwarding engines may use the configuration data from these tables by reading the tables in the control plane and updating local copies of the tables for each of the hardware forwarding engines. In some embodiments, writer agent 210 of control plane 202 writes the configuration data and multiple readers (e.g., one or more of the reader agents 1-N) for the hardware forwarding engines may read this data.

In some embodiments, writer agent 210 notifies reader agents 1-N of changes, updates, additions, and removal of object entries by writing notifications to notification queue 228. Based on the specialized notification characteristics, a reader agent may infer certain actions, functions, and directions. The reader agent picks up the notification and intelligently determines the entry location being affected even though the notification does not necessarily reveal the exact location. Accordingly, the notification is designed to be annotated, brief, a memory space aware feature. In addition, the readers are useful for building asynchronous, distributed, cooperating processes. Process logic is triggered upon receipt of attribute notifications, from notification queue 228, delivered via the reader from tables, producing further state changes for other services that correspond to this process, such as, without limitation, the processes of data plane 204. The notifications can include updated configuration data for a process that describes an aspect of a state of the originating process.

Figure 4:
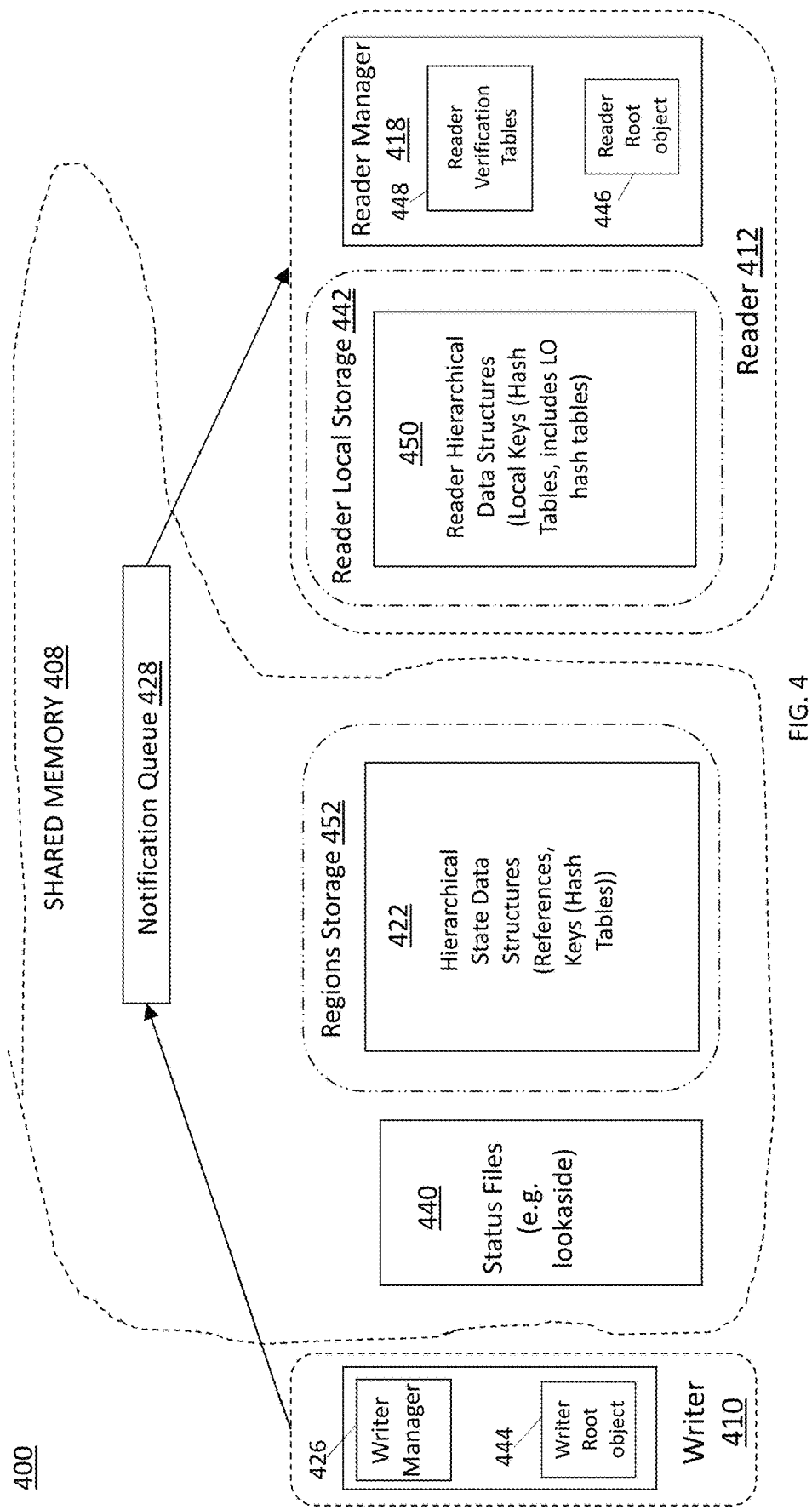
FIG. 4 shows an illustrative diagram of a hierarchical state sharing system 400, in accordance with some embodiments of the disclosure.

FIG. 4 shows an illustrative diagram of a hierarchical state sharing system. In FIG. 4, a hierarchical state sharing system 400 is disclosed, in accordance with an embodiment of the disclosure. In some embodiments, FIG. 4 illustrates an example of a memory allocation arrangement of a hierarchical state sharing system, such as systems 400, 100 and 200 of FIGS. 4, 1 and 2, respectively. In particular, system 400 is shown to include a shared memory 408, a writer 410, and a reader 412. Shared memory 408 is analogous to shared memory 108. Writer 410 may be configured as writer agent 110 including a writer manager. Reader 412 may be configured as reader agent 212 with a reader manager.

Shared memory 408, in FIG. 4, may be configured to include notification queue 428, status files 440, and regions storage 452. Writer 410 is shown to include a writer manager 426, and reader 412 is in turn shown to include a reader local storage 442 and a reader manager 418. In some embodiments, writer 410 is analogous to a combination of writer agent 110 and writer manager 126 or writer agent 210 and writer manager 226 In some embodiments, reader 412 is analogous to one of the reader agents 1-N and corresponding reader managers of FIGS. 1 and 2, for example, reader agent 112 and reader manager 118. In some embodiments, writer 410 is analogous to the combination of a writer agent and a corresponding writer root object, for example, the combination of writer agent 110 and a writer root object or the combination of writer agent 210 and a corresponding writer root object. In some embodiments, reader 412 is analogous to a reader object and a reader root object, for example, one of the reader agents 1-N of FIGS. 1 and 2 and a corresponding reader root object, for example, a reader root object 446, in FIG. 4.

In the embodiment of FIG. 4, regions storage 452 is shown to include hierarchical state data structures 422. Writer manager 426 is shown to include writer root object 444. Reader manager 418 is shown to include a reader root object 446 and one or more reader verification tables 448. In some embodiments, notification queue 428 is analogous to notification queue 118 and notification queue 228. Reader local storage 442 is shown to include reader hierarchical state data structures 450.

In the embodiment of FIG. 4, regions storage 452 is a portion of shared memory 408 organized, at least partially, into regions of hierarchical state data structures 422. In some embodiments, remaining portions of shared memory 408, portions other than regions storage 408, may be configured other than as regions. For example, portions of shared memory 408 including status files 440 and notification queue 428 may not be organized into regions. In some embodiments, shared memory 408 is made of shared memory buffers and regions storage 452 occupies at least some of the shared memory 408 buffers. Status files 440 and notification queue 428 may also each comprise one or more shared memory buffers. Alternatively, status files 440 and notification queue 428 may each comprise other types of memory. In various embodiments, status files 440 may store information regarding object entry data. For example, and without limitation, status files 440 may include status entry and entry metadata field flags (e.g., advertised flag, occupied flag, lookaside flag).

In some embodiments, hierarchical state data structures 422 is made of tables of one or more hierarchies of data values, references, keys, or a combination thereof. For example, reference counted objects may be part of a particular hierarchy that also includes key-value pairs (hash tables). Similarly, being a copy of the hierarchies of regions storage 452, reader hierarchical state data structures 450 may be made of tables of one or more hierarchies of references, keys, or a combination thereof.

Notification queue 428 includes writer-generated notifications, as previously discussed. As writer 410 writes notifications in notification queue 428, reader 412 reads the notifications from notification queue 428. It is understood that while one reader, reader 412, is shown in FIG. 4, this is merely for the simplicity of illustration and discussion, and that additional readers may be a part of system 400. Reader 412 reads notifications from notification queue 428 and based on the notifications, takes certain actions. In some cases, reader 412 verifies the hierarchy to which an object or entry may belong. Reader 412 may resolve the hierarchy by a verification table in reader verification tables 448 of reader manager 418. In some cases, based on the notification, reader 412 may make certain inferences improving the performance and efficiency of system 400. It is understood that tables 448 may comprise one or more tables and in cases of using one table or fewer table than the number of requisite associations, each association may be indexed into the corresponding table. In some embodiments, inferences are made based on the immutable characteristic of an object, entries may be verified using one or more verification tables in tables 448, and certain parent to child relationship-related rules are instituted based on a unique parent-child addressing scheme for memory conservation measures.

An immutable object is one that cannot be changed and is limited to either being added to a hierarchical collection of objects or deleted from the hierarchy. In accordance with an example embodiment, reader 412 first reads a corresponding notification from notification queue 428. The notification includes a location identifier identifying the entry in a region of regions storage 452 of shared memory 408, in some embodiments, the location identifier is a region identification (ID), offset pair, the region identification identifies the region where the entry is located in shared memory 408 and the offset is an offset location within the region where the entry is located. Assuming a child entry location identifier (region, offset pair) is {1:22}, region 1, offset 22, a parent location identifier may be retrieved from the 1, 22 entry location. In some embodiments, the entry at 1,22 includes an entry payload (or object instance) and a parent location identifier identifying the location of the parent of the entry in shared memory 408. For example, the parent location identifier of the child object located at {1:22} may be {5:50}, that is, the parent object is located at region 5, offset 50. If this is the first-time reader 412 is learning of the entry, reader 412 is guaranteed to already know of the parent of the entry because in some embodiments, according to a predetermined parent-child rule, a child object cannot be created before its corresponding parent object is created. Accordingly, to learn of a new child object is to necessarily know of its parent object. Reader 412 therefore determines to add the entry to its local hierarchical collection. Reader 412 maintains a local copy (in reader hierarchical data structures 450 of reader local storage 442) of the hierarchical state data structure in hierarchical state data structures 452 of shared memory 408. Reader 412 searches a first table of its tables 448 using the parent location identifier of the new child entry to find a corresponding parent object corresponding to the new entry. Upon locating the parent object in the table, reader 412 uses the parent object to create the child object, linking the child object to its correct parent object in the reader hierarchical state data structure of the reader hierarchical data structures 450 of reader local storage 442. In some embodiments, reader 412 is considered to have learned of an entry for the first time in the absence of existing bookkeeping of the entry, for example, the entry is not found in a relevant table of tables 448. Reader 412 therefore treats the entry as an entry to be created.

With continued reference to the example above, when faced with a subsequent notification with location identifier {5:50}, in cases where the parent object is reference-counted, reader 412 may realize the entry already exists, the reader may infer that the parent object that the reader had previously learned about at the same location identifier, {5:50} has been deleted. What is more, the reader may infer that not only has the old parent object at {5:50} been deleted, the reader may further infer that every child object of the old parent object has been deleted. For example, among potentially other child objects of the old parent object, the reader may infer that the child object at {1,22} has been deleted. Accordingly, reader 412 makes an inference, therefore, the parent must be removed. In some embodiments, reader 412 proceeds to remove the parent object from its local collection by searching for the entry, {5:50}, in a second table of verification tables 448 and retrieving its local parent object (the grandparent of {1:22}) once found, this parent object (associated with shared memory location identifier {88:99}) being directed to remove the first parent object (at parent location identifier {5:50}) from the reader's local hierarchy collection in data structures 450 of reader local storage 442. Similarly, other reader local tables may assist reader 412 in accurately locating parent-child relationships in shared memory 408 based on the reader's local hierarchy collection.

In some embodiments, writer root object 444 and reader root object 446 are the same root object of the same hierarchy. Reader 412 maintains a copy of the root of a local hierarchy, for example, a hierarchy of data structures 450 and the same root object serves as the root object for the mirroring hierarchical state data structure in regions storage 452 of shared memory 408. In some embodiments, root object 444 is maintained in shared memory 408. In embodiments, the writer manager has convenient and reliable knowledge of the corresponding hierarchy. In embodiments where the root is stored in shared memory, the root location is linked to the rest of the corresponding hierarchy to accommodate dispersed descendant objects of the root. An example of dispersed objects of a hierarchy is presented and discussed relative to FIG. 5. In some embodiments, an object that is not a child of any parent may be a root object. In some embodiments, root objects are designated with a predetermined designation for efficient identification. For example, a root object may be represented with a value representing NULL or some other value or indicator representing something different. In some embodiments, no designation is used to identify a root object and an object in hierarchical state data structures 422 may be determined to be a root object by virtue of a corresponding parent location identifier of the object being an empty field or some reserved location identifier.

Figure 5:
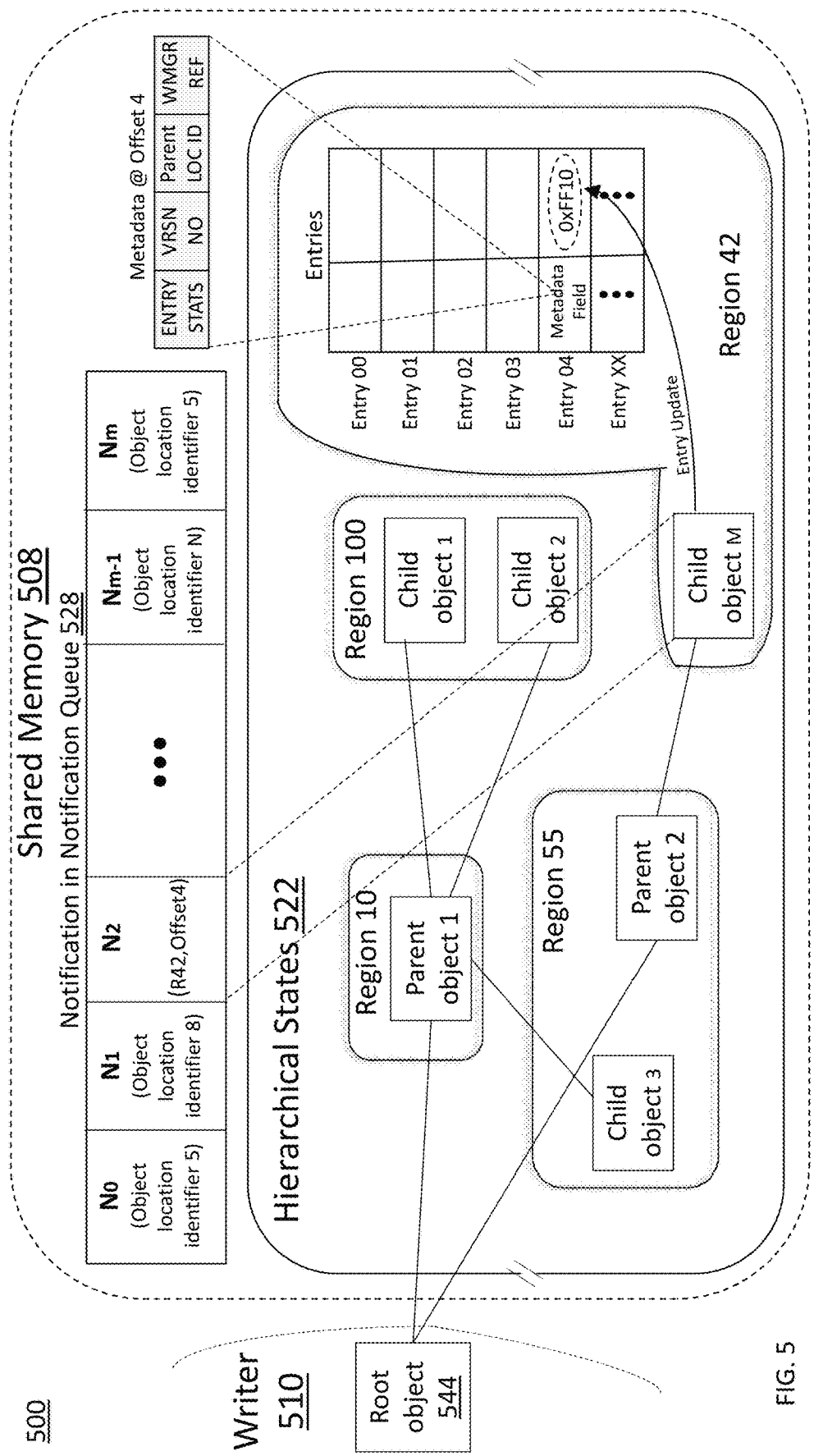
FIG. 5 shows an illustrative diagram of a hierarchical state sharing system 500, in accordance with some embodiments of the disclosure.

FIG. 5 is an illustrative diagram of a hierarchical state sharing system. In FIG. 5, a hierarchical state sharing system 500 is disclosed, in accordance with an embodiment of the disclosure. In some embodiments, FIG. 5 illustrates an example of a shared memory and writer of a hierarchical state sharing system, such as the systems 400, 100 and 200 of FIGS. 4, 1 and 2, respectively. In FIG. 5, system 500 is shown to include a shared memory 508 and a writer 510. Writer 510 includes root object 544, analogous to root object 444 of FIG. 4. Similarly, writer 510 is analogous to writer 410 in accordance with some embodiments. Root object 544 is shown as the root of a hierarchical state data structure 522 of shared memory 508.

As earlier discussed, a shared memory may be organized into regions of object entries. In some embodiments, a shared memory made of buffers may allocate a region to one or more buffers and similarly, an entry of a region may be allocated to one or more shared memory buffers. For the purpose of simplicity of illustration, in the embodiment of FIG. 5 and all subsequent figures, an entry is presumed stored in a single shared memory buffer.

In the embodiment of FIG. 5, shared memory 508 is shown to include notification queue 528 including "m" number of notifications, "m" representing an integer value. Each notification is designated with the capital letter "N" with a subscript signifying the notification number. For example, the first notification is represented by "$N_0$", the second notification is represented by "$N_1$" and so forth. Further, each notification of notification queue 528 identifies a region and a corresponding offset of an entry in hierarchical state data structure 522. For example, notification N2 identifies the entry at region 42, offset 4, in shared memory 508. As earlier noted, in some embodiments, the root object of the hierarchy shown is stored in a writer local storage. In FIG. 5, root object 544 is housed by writer 510. The hierarchy includes two levels, a single parent object level comprising two parent objects that are children of root object 544, parent object 1 and parent object 2, and a single level of child objects comprising four child objects, child object 1-M, "M" representing an integer value. It is understood that while two levels of hierarchy are shown in FIG. 5, the hierarchy of shared memory 508 may take a different and any number of hierarchy levels. Analogously, each level of the hierarchy may include a different and any number of objects.

Parent object 1 and parent object 2 are children (or direct descendants) of root object 544 whereas child objects 1-M are grandchildren of root object 544 and children of parent objects 1 and 2. For example, child object 1 and child object 2 and child object 3 are children to parent object 1 and child object M is child to parent object 2. Generally, an object has an entry and the object entry includes the object with its data field. While not shown with respect to the other objects, child object M includes an entry with 0-XX data fields, for example.

One or more of the objects of the hierarchy of FIG. 5 may be stored in a region of shared memory 508 and the regions of shared memory 508 may be randomly or structurally allocated to the objects of the hierarchy. In the embodiment of FIG. 5, the objects of the hierarchy are housed in random regions of shared memory 508. For example, parent object 1 is a part of region 10, child object 3 and parent object 2 are a part of region 55, child object 1 and child object 2 are a part of region 100, and child object M is a part of region 42.

Each entry of the set of entries of child object M includes a metadata field and a payload (or object instance or entry data) field. For example, entry 4 of child object M of region 42 is shown to include a metadata field and payload field with the latter including the hexadecimal value 0xFF10 for the purpose of demonstration. In some embodiments, a metadata field includes entry status relating to certain status of the corresponding entry for use in verifying, or not, certain current status of a corresponding entry. An entry metadata field may include other types of information regarding the corresponding field for confirming and identifying the location of a corresponding entry, for example. In some embodiments, in addition to entry status, a metadata field may include location information identifying the particular hierarchy to which a corresponding entry belongs and the location of a parent of the entry within the hierarchy, in addition to the current status of the entry data. For example, a metadata field may include a version number, a parent location identifier, and a writer manager reference, in addition to entry status. In an illustrative example, the metadata field at entry 4 of child object M is shown to include an entry status telling of the current status of the data maintained at entry 4, e.g. 0xFF10, the version number of entry 4, the parent location identifier of entry 4, and the writer manager reference of entry 4. The parent location identifier of entry 4 may be a location identifier of parent object 2 in region 55 of shared memory 508. The writer manager reference of entry 4 may point to the location of a writer manager of writer 510. In some embodiments, the writer manager reference may point to a writer manager used to locate the root object, such as root object 544 in the embodiment of FIG. 5.

In some embodiments, the region, offset pair of a notification queue, identifies the entry number (or offset) in the region identified by the pair. For example, with reference to FIG. 5, the notification $N_2$ identifies region 42 and offset 4, which corresponds to entry 4 of child object M in region 42. In an example system 500 operation, writer 510 may write notification $N_2$ in notification queue 528 for consumption by one or more readers of shared memory 508 (not shown in FIG. 5). For example, reader 412 of FIG. 4, may concurrently with the writer writing to shared memory 508 (and other readers consuming data from shared memory 508), read shared memory 508 entries and do so with a lock-free and wait-less experience. A reader of shared memory 508 picks up notification $N_2$ and based on the location identifier at $N_2$, {42:4}, locates the entry corresponding to $N_2$ at region 42, offset (or entry) 4. As discussed above and will be further discussed relative to subsequent figures herein, the reader may take certain confirmation and validation measures before trusting the entry 4 data and the status of entry 4 data, in some cases. A reader of shared memory 508 may make certain inferences based on the metadata field of entry 4 regarding the entry and the corresponding object, child object M.

For example, in a reader notification handling process, the corresponding reader manager (e.g., reader manager 418, 218, and 118 of FIGS. 4, 2, and 1) may perform the following process steps and in the meanwhile make certain inferences. A reader, such as reader manager 418 of FIG. 4, reads the next notification from a corresponding shared memory notification queue, such as notification queue 428 of FIG. 4. Next, reader manager 418 determines whether the location, identified in the read notification of the notification queue (e.g. region, offset pair) references an occupied entry, an entry with data in the shared memory. Reader manager 418 may make the foregoing determination based on certain entry metadata field information in the shared memory. In response to determining the entry is occupied, the reader manager 418 performs or causes to be performed a version integrity confirmation process, shown and discussed relative to FIGS. 20-22 herein. In some embodiments, reader manager 418 may make certain determinations regarding the integrity of the entry data and in response to determining the data integrity is questionable, reader manager 418 may simply drop the notification, decide to stop processing it and proceed to processing the next notification from notification queue 428. Reader manager 418 may make entry data integrity determinations based on certain entry metadata field contents, the metadata field corresponding to the entry.

In response to reader manager 418 determining the entry does not contain advertised data, data that is not yet ready for reading by readers of the shared memory, reader manager 418 may proceed to update its reader verification tables accordingly. But if no corresponding local entry is found in the reader verification tables for the entry referenced by the notification, reader manager need not update any reader verification table and rather makes an inference that the reader has never learned of the entry, and determines to simply drop the notification and to proceed to processing the next notification. But if reader manager 418 determines that the reader has previously learned of the notification entry, reader manager 418 informs the corresponding parent of the entry in the local reader hierarchical state data structure to remove the entry from its collection because due to the immutable nature of the object entry, assuming the object entry to be of an immutable type, and with the advent of the second notification, the valid data may be used to create a new object after deletion of the old parent.

Generally speaking, a parent object might contain a key (of a key, value pair), in addition to other data. A parent object may itself contain one or more collections of objects. Reference-counted data type of objects may be immutable although in some cases, they may be mutable. In cases where a reference-counted object is immutable, one or more of its collections, assuming it has one or more collections, can be mutable. A parent object, being a referenced-counted data type of object, may know one or more of its child objects. Whereas, some objects are not reference-counted and may instead be simple objects. Simple objects, in some embodiments, do not have associated child objects, for example, they are typically a part of the last hierarchical level of a hierarchical state data structure. An example of a collection of simple objects is shown at hierarchy level 708 in FIG. 7. Nonlimiting examples of simple objects in a networking environment are routes and MAC addresses. A simple object is an object that is not reference-counted and with no associated manager (for example, a writer manager) referencing an object to which the simple object corresponds. In exemplary embodiments with simple objects lacking an associated writer manager reference in their corresponding entry metadata field in the shared memory, simple objects take up less shared memory space than their counterpart reference-counted data types of objects.

In some embodiments, a parent object knows its children object types from a writer perspective and a reader perspective. The writer is the original builder and therefore a legitimate owner of the hierarchy. To this end, the writer is fully aware of the types of objects it is building in shared memory. For example, the writer is fully aware of which and whether reference-counted objects have corresponding writer manager references as the writer makes sure to identify certain writer manager references in the metadata field of certain child object entries when creating the child objects. In some embodiments, the writer further identifies parents of certain child objects in corresponding entry metadata fields. From a reader standpoint, a parent object knows of its child object type based on a reader inference of corresponding notifications in the notification queue. As noted above, in some embodiments, a parent object can infer and learn of its child object type based on an attribute identification. For example, the parent location identifier of a child object has an added attribute identification in a corresponding metadata field linking the child object to the parent object. Therefore, a parent object would know of its child object type and so would the reader.

A reference-counted object additionally differs from a simple object in that it can live beyond its corresponding hierarchical collection whereas a simple object cannot. That is, if in the client code of a writer, a pointer to a reference-counted object is being held, even if the object is removed from its collection, the object will not be destroyed and rather stays alive until all (or a threshold number of) pointers referencing the object are removed. Accordingly, the lifecycle of a reference-counted data type of object is not necessarily tied to its corresponding collection, the object can be removed from its collection but still live on for some indeterminate amount of time until a corresponding reference count reaches a predetermined value or a predetermined number of references are counted down to a certain value.

In some embodiments, when the last reference count is reached, the object knows how to de-allocate itself. In some embodiments, the object employs its writer manager reference from a corresponding entry metadata field to destroy itself. On the other hand, simple objects are not reference-counted and when one such object is removed from a collection, the object is destroyed with no delay—deallocation occurs immediately without the requirement for reference counting before object destruction. There is also no need to keep track of the writer manager for simple objects because a simple object is guaranteed to belong to a parent object—a hierarchy-related rule. Because simple objects need not maintain a writer manager reference, simple objects typically consume less storage space of the shared memory and are memory conscious objects relative to their counterpart reference-counted objects. Accordingly, in some embodiments, simple objects tend to be higher scaled.

In some embodiments, the notifications of notification queue 528 may be coalesced. In some embodiments, notifications of notification queue 528 may be removed when the slowest reader has seen the notification. In some embodiments, after fully processing all notifications, a reader may send a message to the writer through a socket to announce completion of notifications processing and the writer, in response to receiving the reader notification completion announcements, the writer can then remove all notifications from the notification queue that every reader has seen—in some cases, even notifications which were not coalesced can be removed.

Notifications of notification queue 528 may be removed in other suitable manners that allow for proper reader consumption as disclosed herein. In some embodiments, notifications of notification queue 528 need not be removed and can be instead overwritten with other notifications. For example, writer 510 of shared memory 508 may coalesce notifications of notification queue 528 that refer to the same location. An example notification coalescing process possibly implemented by system 500, is disclosed in US Patent Publication No. 2016/0253098, entitled "System and Method of a Shared Memory Hash Table with Notifications", and filed on May 11, 2016, by Hollbrook et al. Use of notifications, as disclosed in various embodiments, prevents storage delays.

In a networking embodiment, the shared memory hash table with notifications can accelerate a targeted number of collections that are very large, have high update rates, and a relatively large numbers of readers (e.g., a routing table with 1 million entries, a Media Access Control (MAC) address table with 288k entries and 16 to 32 readers). In one embodiment, the shared memory hash table notifications operate on the principle of coalescing the notification. In this embodiment, the writers and readers operate independently by running at their own speed, within bounded memory. In addition, concurrency is handled via wait-free and lock-free data protocols by using 64-bit atomic load/store operations. In this embodiment, atomic read-modify-write variants are not needed. Furthermore, the shared memory hash table does not utilize shared locks, which allows linear scaling of throughput over multiple CPUs as more readers and writers are added.

In some embodiments, writes to the shared memory hash table are coalesced in-place. In this embodiment, a fast writer does not block or consume unbounded memory because of slow or stuck readers. In addition, writers operate independently of the progress or the state of the readers, and vice versa. In one embodiment, the granularity of change notification is a compound value type consisting of multiple individual attributes in a value type rather than individual attributes. Thus, the maximum number of notifications that can ever be queued at once is bound by the number of elements in the table. For example, the writer may create an entry at offset {1,10} with object A. The writer may later modify the entry to object A', and then again with object A". Due to the coalescing nature of the notifications of notification queue 528 or that of notification queues 428, 228, and 128 of FIGS. 4, 2, and 1, the first time a reader of a common shared memory processes the same entry, the entry may contain object A, or A', or A" based on the time the reader reads the entry relative to the writer-creation and writer-modifications to the entry. For example, the reader may learn only about the creation of A" and ignorant of prior modifications (A and A') of the same entry, or it may learn about the creation of A and then modification to A' and then learn about modification to A", or perform other learning order combinations. Accordingly, notification coalescing allows the reader to catch up with learning, for example, an initial shared memory state, while maintaining the guarantee that a reader processing the queue will eventually reach a consistent state relative to the shared memory.

Figure 6:
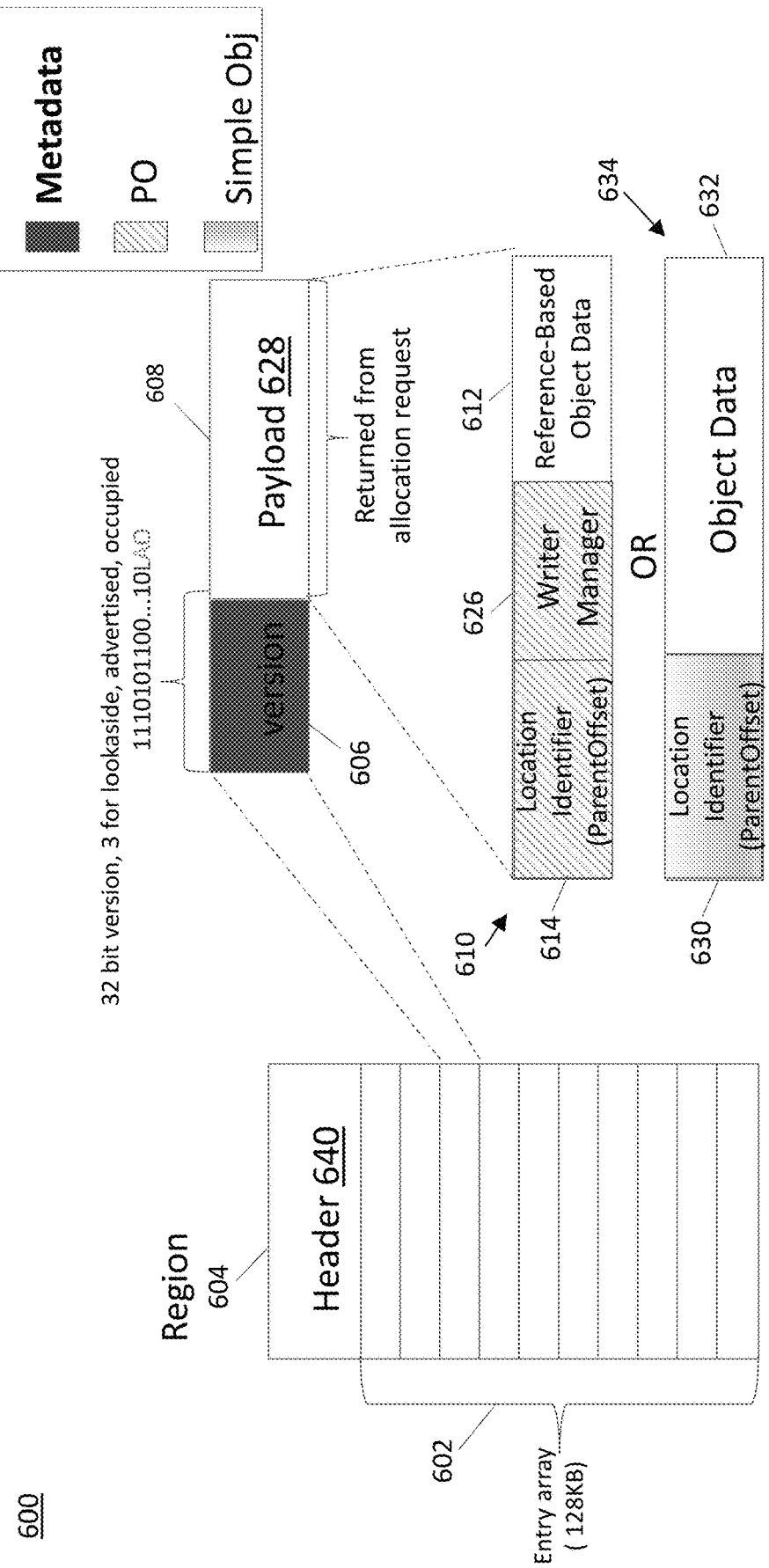
FIG. 6 shows an illustrative diagram of a hierarchical state sharing system 600, in accordance with some embodiments of the disclosure.

FIG. 6 is an illustrative diagram of a hierarchical state sharing system. In FIG. 6, a hierarchical state sharing system 600 is disclosed, in accordance with an embodiment of the disclosure. In some embodiments, FIG. 6 illustrates an example of a shared memory region of a shared memory produced by a writer, such as without limitation, writer 410 of FIG. 4, and consumed by readers of the shared memory, such as without limitation, readers 412 of FIG. 4. It is understood that the embodiment of FIG. 6 may equally apply to writers, readers, and shared memory other than those shown and described herein. In FIG. 6, system 600 is shown to include a region 604. In some embodiments, region 604 may be one of the regions in regions storage 452 of FIG. 4, or regions 10, 42, 55, and 100 of FIG. 5, for example.

Region 604 is shown to include a header field 640 and a corresponding set of entries 602, a set including one or more, in accordance with an embodiment of the disclosure. Header field 640 may be used for validation of entries 602 and may further include an entry count of the number of entries 602 in region 604. Header field 640 may further include an entry size for the set of entries 602, in addition to possible other information relative and relevant to the entries of region 604.

During a first allocation process for a chunk of shared memory, such as described above, for example, the entries 602 of region 604 of the shared memory are initially empty fields of shared memory buffers, allocated to a client on an as-needed (as-requested) basis. In response to a writer request for allocation for an entry, an entry of the set of entries 602 may be returned, pre-entry creation, the entry may include an empty data field and a corresponding (not empty) metadata field. In some embodiments, a writer manager handles the allocation request and returns an allocated payload. For example, writer manager 426 of FIG. 4 may perform an allocation request. When the writer initially creates the entry, the entry data field includes the writer-written data. Example methods and embodiments for allocation by a writer of the various embodiments herein, such as writer 410 of FIG. 4, are illustrated and described in U.S. patent application Ser. No. 16/516,995, entitled "System and Method of a Shared Memory Allocator", filed on Jul. 19, 2019, by Ritchie, et al., incorporated herein by reference as though set forth in full.

In some embodiments, post-allocation, a version field of an entry may include at least some of the metadata for the entry. For example, in the embodiment of FIG. 6, an entry 608 of entries 602 is shown to include a version field 606 and a payload field 628. A writer manager, such as writer manager 426 of FIG. 4, generates version field 606. In some nonlimiting examples, version field 606 includes version number information in addition to entry status. Version field 606 may include other information relevant to the entry being created, such as the entry size. In some embodiments, the size of all entries of entries 602 is the same and may be maintained in addition to or in place of version field 606, in header field 640 although in embodiments where the entry size of the set of entries 602 may differ, an entry size may be maintained in both, for example, in every version field, such as field 606, as well as a region header field, such as field 640. In some embodiments, an entry status may be a part of the entry version field and in some embodiments, an entry status field may be an entirely separately-kept field relative to the entry version field.

In the embodiment of FIG. 6, the entry status is presumed a part of version field 606 for improved memory space efficiency measures, as the version information of an entry does not require all bits of the version field for proper representation and the version filed spare bits may be put to use for representing the entry status. With continued reference to FIG. 6, version field 606 may be 32 bits wide and the lower three bits of the 32 bits may be employed for the entry status. In an example embodiment, the status includes a flag representing a changing state of an entry, i.e. a lookaside flag representing validity of the entry data, i.e. an advertised flag representing the validity of the entry data, i.e. an occupied flag representing the allocation status of the entry, or a combination thereof. It is understood that other types of entry status or a fewer or an additional number of entry status flags may be included in the version field or otherwise. Example applications of at least some of the entry status flags are described relative to the flow chart figures to follow. In some embodiments, each of the flags may be represented by one or more bits. In the embodiment of FIG. 6, each flag is represented by one bit. Version field 606 also includes version information as noted above. The version information may occupy one or more bits. In some embodiments, for certain object types, only the payload of an entry, such as the payload of payload field 628 is returned to a writer client, for example, reference-counted objects may be accordingly managed. In some cases, a version number of version field 606 may be employed for verifying entry data version integrity. For example, a reader may perform a version integrity confirmation process, as described relative to FIGS. 20-22 to follow, using the version number of version field 606.

Reference-counted objects have a payload that typically includes a payload metadata field of its own. For example, in FIG. 6, payload 628, which is also referenced as entry 610 in FIG. 6, includes reference-based object data 612 in addition to certain metadata related to the object data 612. For example, the metadata field of payload 628 may comprise a writer manager 626 and a location identifier 610. Writer manager 626 is a reference to the location of the writer manager corresponding to the hierarchical state data structure to which entry 610 belongs and location identifier 614 may be a reference to the location of the parent object of the entry 610 object. In cases where a parent object of an entry is a root object, location identifier 614 may be an empty field or a pre-designated field for root entries, as previously discussed. Some hierarchical state data structures include one or more simple objects, as previously discussed. The payload of a simple object, in some cases, is different than the payload of a counterpart reference-counted data object in that the former does not include a writer manager reference. For example, in the embodiment of FIG. 6, entry 634, which may be another entry of the set of entries 602, is shown to include object data 632 and a (parent) location identifier 630 and no corresponding writer manager reference. Simple objects generally do not need to know how to allocate or deallocate corresponding entries and therefore do not need to know their hierarchy's writer manager reference. In contrast, reference-counted-based objects, such as parent objects, have a need for the writer manager reference when allocating and deallocating corresponding children objects. For example, a parent object may allocate and/or deallocate a child object that is a simple object and must therefore know the corresponding writer manager reference of the simple object.

Figure 7:
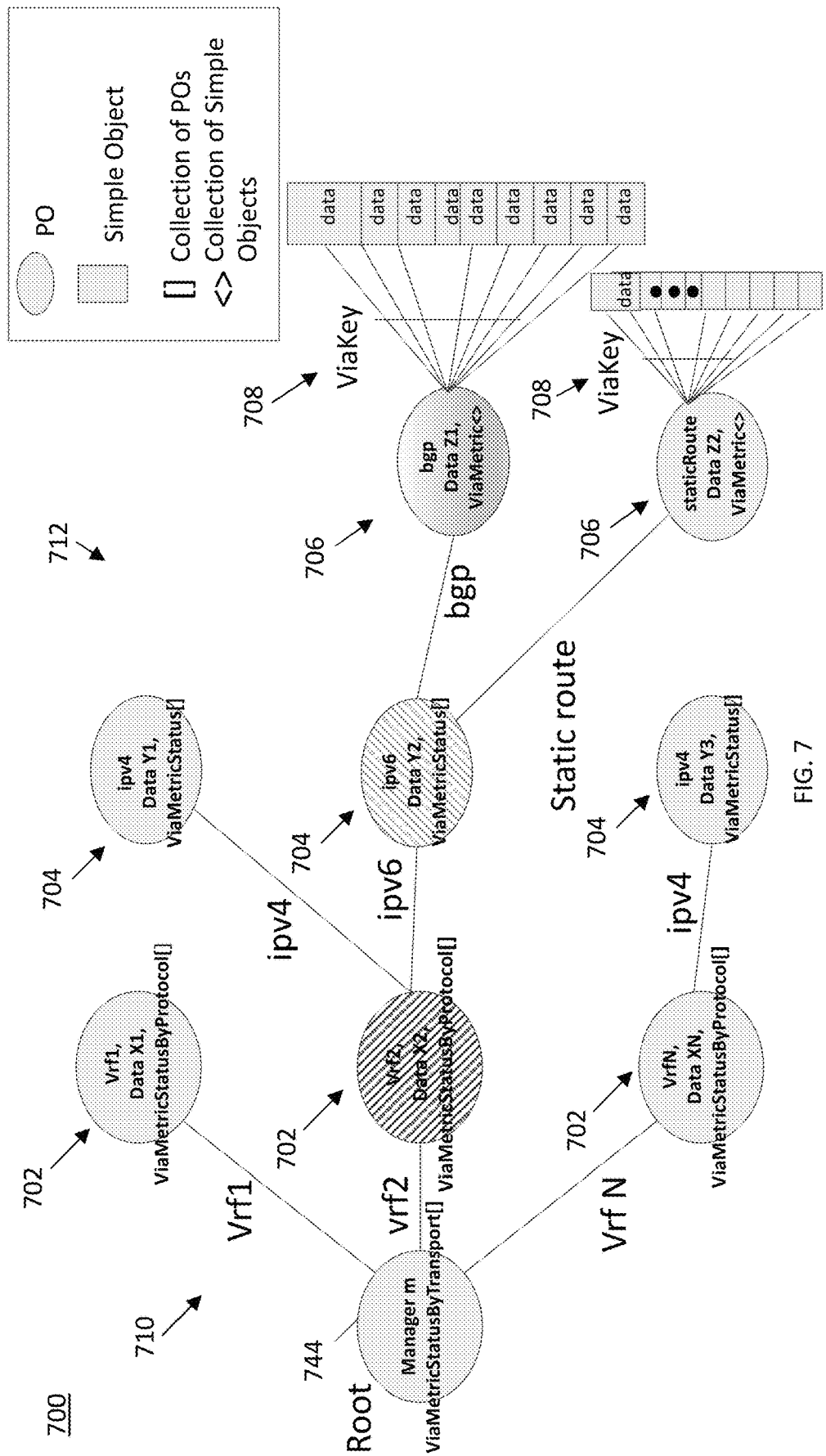
FIG. 7 shows an illustrative diagram of a hierarchical state sharing system 700, in accordance with some embodiments of the disclosure.

FIG. 7 is an illustrative diagram of a hierarchical state sharing system. In FIG. 7, a hierarchical state sharing system 700 is disclosed, in accordance with an embodiment of the disclosure. In some embodiments, FIG. 7 illustrates an example of a hierarchical state data structure 710 of a shared memory 712. For example, hierarchical state data structure 710 may be analogous to hierarchical state data structure 122 or 222 of FIGS. 1 and 2, respectively, and shared memory 712 may be analogous to shared memory 108 or 208 of FIGS. 1 and 2, respectively. It is understood that the embodiment of FIG. 7 is merely an example arrangement of a hierarchical state data structure and that other data structures may be configured differently, for example, with a different number of hierarchical levels and a different number of objects at each level. A hierarchical state data structure may include a single object, for example, a root object, and alternatively may include a root object with the addition of one or more related hierarchical levels, each level including one or more objects, as in the embodiment of FIG. 7. Hierarchical state data structure 710 is shown to include various object types and various collections of object types. A parent object (PO) is represented by an oval symbol, a simple object is represented by a rectangle symbol, a collection of parent objects is represented by a set of square brackets, "[ ]", and a collection of simple objects is represented by a set of angular brackets, "< >". Parent objects are reference-counted data objects and simple objects may be references and data, but they are not reference-counted data. A collection of parent objects may include one or more sub-collections of other collections of different or similar collection object types. Each sub-collection of at least some parent objects may yet include a sub-collection of objects and so on. While parent objects may be immutable, collections of the parent objects need not be immutable.

The objects of FIG. 7 are shown arranged in the hierarchical fashion of data structures 710 with each of the hierarchy levels, 702-708, representing a Vrf-related characteristic. Each level includes objects with entries keyed by a corresponding characteristic type. Every entry within the hierarchy is keyed by a routing property and has a corresponding key-value pair value that can be empty unless a corresponding object includes one or more collections of its own, or the value may contain meaningful data. A root object 744 of hierarchical state data structure 710 is associated with the writer manager for the hierarchy from which the hierarchy levels 702-708 of objects are derived. As mentioned above, each entry within hierarchical state data structure 710 is keyed by a distinct Vrf property and the key has an associated value. The value may be empty with the exception of sub-collections of the collection, if any, or the value may contain meaningful data. Readers of shared memory 712, determine which collection to which each key-value pair belongs using various embodiments and methods of the disclosure, as discussed herein.

The example hierarchical state data structure 710 of FIG. 7 is an example of an IpRib Vrf collection of a shared memory of which a writer IpRib agent is a producer and reader forwarding agent is a consumer, analogous to the example of FIG. 2. A root object 744 may be saved in a writer manager (e.g., writer manager 426) of a writer, such as writer 410 of FIG. 4. The next level of hierarchy immediately following root object 744, hierarchy level 702, includes objects that are keyed by Vrfs, e.g., Vrf 1, Vrf 2, . . . , Vrf N. The objects at level 702 are child objects of root object 744 and parent objects to objects of the next immediately following hierarchy level, level 704. The objects at level 704 are child objects to objects of level 702, grandchildren of root object 744, and parent objects to objects of level 706 and keyed by transport protocols, e.g., Ipv4 and Ipv6. The objects at level 706 are child objects to objects of level 704, great grandchildren of root object 744, and parent objects to objects of level 708, and keyed by routing protocols, such as the border gateway protocol (BGP or "bgp") and static routing. Objects of level 708 are simple objects in hierarchical state data structure 710. For simplicity of illustration, each keyed entry at level 708, in FIG. 7, is shown to store only data but it is understood that each keyed entry may store more than just data, such as key and location in addition to data that in a practical application may all be stored as a single hash map. Data may be in various forms, such as without limitation, in integer, pointer, or string form.

At level 702, each parent object is a collection and shown to include a Vrf identification/identification, data, and via metric status by protocol key: Vrf1, Data X1, ViaMetricStatusByProtocol[ ] (keyed by Vrf1); Vrf2, Data X2, ViaMetricStatusByProtocol[ ] (keyed by Vrf2); and VrfN, Data XN, ViaMetricStatusByProtocol[ ] (keyed by VrfN). At level 704, each parent object is a collection and shown to include a transport protocol identification, data, and via metric status key: ipv4, Data Y1, ViaMetricStatus[ ] (keyed by transport protocol Ipv4); ipv6, Data Y2, ViaMetricStatus[ ] (keyed by transport protocol Ipv6); and ipv4, Data Y3, ViaMetricStatus[ ] (keyed by route protocol Ipv4). At level 706, each parent object is a collection shown to include a routing protocol, data, and via metric key: bgp, Data Z1, ViaMetric< > (keyed by routing type BGP); and staticRoute, Data Z2, ViaMetric< > (keyed by routing protocol static route). At level 708, the last level of the hierarchy, each object entry is a simple object, a key-value pair with no child object. The data of each of the simple object entries represents a state of a metric of a corresponding via corresponding to a Vrf. An object entry within a collection stores a key, location, and data. The simple objects at level 708 are child objects to the simple object collection staticRoute, Data Z2, ViaMetric< > at level 706 and correspond to Vrf 2, and the simple objects at level 708 are child objects to the simple object collection bgp, Data Z1, ViaMetric< > at level 706 and also correspond to Vrf 2.

In the embodiment of FIG. 7, parent objects and parent object collections are presumed immutable with the exception of their collections or sub-collections, as the case may be. In some embodiments, parent objects and parent object collections may be mutable and in these embodiments, not only are entry locations notified by a writer to readers, changes to attributes within the hierarchy are also notified by the writer to readers of the shared memory, via the notification queue. Additionally, one or more reader verification maps (tables), such as reader verification tables 448 of FIG. 4, may store not only the location of the entry but also an attribute identification (within the hierarchy) of the entry. In embodiments with mutable parent objects and parent object collections, memory usage may be greater relative to embodiments with immutable parent objects and parent object collections given the extra storage space required for the attribute identification.

In a practical application of a mutable parent object, such as the example of FIG. 7, with reference to level 702, the parent location identifier within a metadata field of a corresponding child object entry may include an identifier of a corresponding attribute within the parent object entry, and the reader verification tables may maintain track of the attribute identifier in the event X1, X2, or XN were to change, for instance. In an embodiment, one or more reader verification table with associations of (entry) location identifiers from notifications and corresponding parent location identifiers from shared memory (as known to the reader) may maintain track of attribute identifications. Without notifying attribute identifiers and only notifying collection location identifiers, the coarse notification granularity may be limiting and inefficient. Whereas, at a finer notification granularity, notifying attribute identifiers allows for updating on a single attribute granularity level and therefore increasing efficiency realization.

With continued reference to FIG. 7, an object may be a collection that itself has one or more collections. For example, the object Vrf2, Data X2, ViaMetricStatusByProtocol[ ], at level 702, shown with backslash lines, itself a parent object collection, has a child object collection at hierarchical level 704, ipv6, Data Y2, ViaMetricStatus[ ] (shown with reverse backslash lines), and another child object collection at hierarchical level 704, ipv4, Data Y1, ViaMetricStatus[ ]. In some embodiments, the children object collections at level 704 cannot be created before the parent object collection at level 702 is created. Analogously, the parent object collection at level 702 cannot be removed before the children object collections at level 704 are removed. Non-compliance with these rules may destroy or render incorrect the parent-child associations and send readers to erroneous locations of the shared memory for consuming writer-written data.

Figure 8:
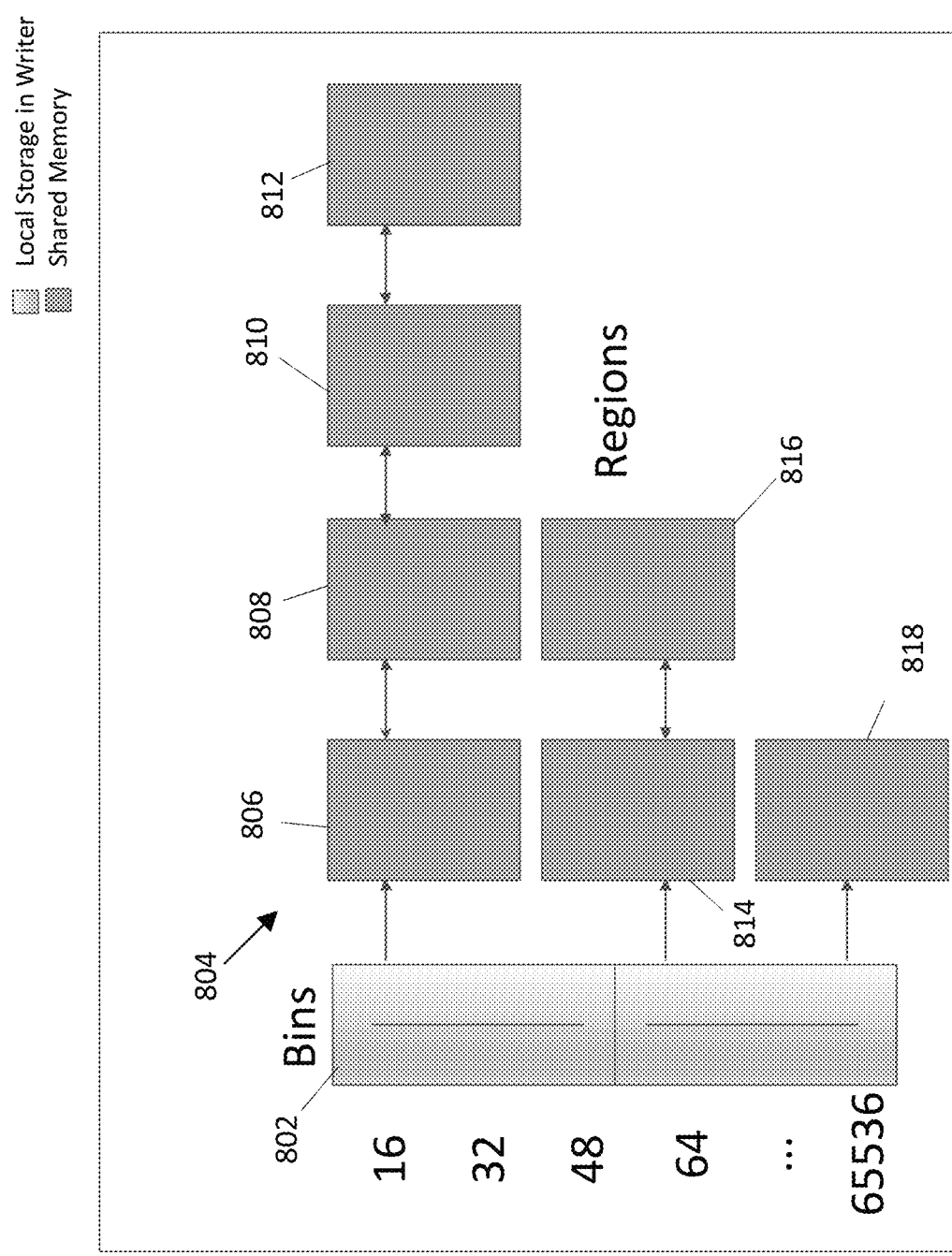
FIG. 8 shows an illustrative diagram of a hierarchical state sharing system 800, in accordance with some embodiments of the disclosure.

FIG. 8 is an illustrative diagram of a hierarchical state sharing system. In FIG. 8, a hierarchical state sharing system 800 is disclosed, in accordance with an embodiment of the disclosure. In some embodiments, FIG. 8 illustrates an example of a portion of a memory configuration 810 of system 800. The memory configuration of FIG. 8 may be applicable to the embodiments of FIGS. 1, 2, 4, 5, and 7. It is understood that the embodiment of FIG. 8 is merely an example memory configuration arrangement of a hierarchical state data structure and that other memory configuration arrangements are anticipated. In the embodiment of FIG. 8, a writer local storage 802 and a set of regions 804 are shown. In an example embodiment, writer local storage 802 may be a part of or incorporated, in part or in whole, into writer 410 or writer manager 426 of FIG. 4 and the set of regions 804 may be a part of a shared memory, such as shared memory 108, 208, 408, 508, or 712 of FIGS. 1, 2, 4, 5, and 7, respectively. Writer local storage 802 is shown coupled to the set of regions 804 for facilitating data and data-related information from a writer to the regions 804 of a shared memory. For example, data to be written, metadata to be activated or deactivated, and object insertion or deletion into a corresponding hierarchy may be transferred for writer local storage 802 to regions 804, as facilitated by an associated writer or writer manager.

In some embodiments, writer local storage 802 is arranged in bins of storage spaces. For example, in the embodiment of FIG. 8, writer local storage 802 includes a bin of 65,536 bytes of entries in a region of memory storage spaces. To create an object that fits in an entry of 64 bytes in size, for example, an appropriately sized region is retrieved by going to a 64-byte bin size for expedient retrieval of an appropriately sized region. Further details of writer local storage 802 and bins thereof are presented in U.S. patent application Ser. No. 16/516,995, entitled "System and Method of a Shared Memory Allocator", filed on Jul. 19, 2019, by Ritchie, et al. Writer local storage 802 need not be arranged in bins and can be arranged in any suitable configuration to accommodate storage of relevant writer information for ultimate storage, at least in part, into one or more regions of regions 804.

In some embodiments, regions with spare (unallocated) space to allocate entries may be at the front of a list in a bin. In some embodiments, regions with unallocated spaces may be listed in a different order relative to other regions with all spaces allocated.

FIGS. 9-12 is an illustrative hierarchical state building example performed by a reader of a shared memory of various embodiments of the disclosure. In the interest of simplicity of illustration, the example of FIGS. 9-12 pertains to the writer IpRib agent example of FIG. 7. The particular example of these figures is to generally illustrate a manner in which a reader of a shared memory builds reader hierarchical states mirroring that of the states of the shared memory hierarchical states. The example of FIGS. 9-12 comes with certain presumptions as follows. The root object of the example hierarchy is in local memory, and children of the root object use the special location identifier {0,0} to denote their parent as the root object. Further, the notification examples of FIGS. 9-12 affect regions 0, 1, and 2 of shared memory 908. The particular states being built by the reader are in accordance with the embodiment of FIG. 7 and for Vrf 2, namely, Vrf2, Data X2, ViaMetricStatusByProtocol[ ] and ipv6, Data Y2, ViaMetricStatus[ ]. Certain conditions, states, and flags are indicated by coding in some of the figures. For example, the rectangular symbol with backslashes signifies that a corresponding notification has been processed by the reader of the shared memory.

Figure 9:
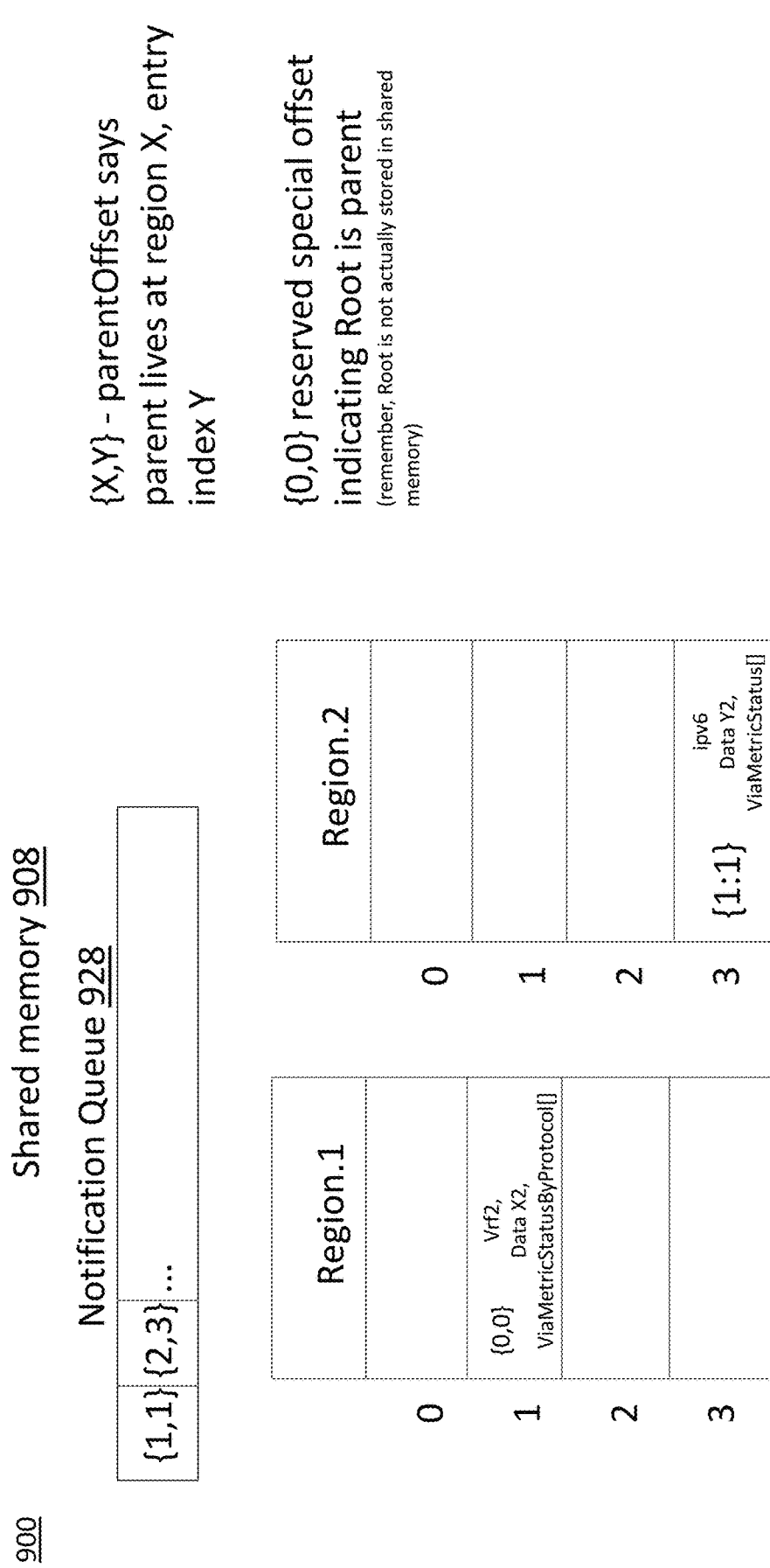
FIGS. 9-12 illustrate a hierarchical state building example performed by a reader of a shared memory of a hierarchical state sharing system, in accordance with some embodiments of the disclosure.

In FIG. 9, a hierarchical state sharing system 900 includes a shared memory 908 and a notification queue 928. In some embodiments, shared memory 908 may be configured as any of shared memories 108, 208, 408, 508, 712, and 804 of FIGS. 1, 2, 4, 5, 7, and 8, respectively. In some embodiments, notification queue 1028 may be configured as notification queue 128, 228, 428, 528, 628, 728, or 828 of FIGS. 1, 2, 4, 5, 6, 7, and 8, respectively. It is however understood that either or both of shared memory 908 and notification queue 928 may be configured differently than that of the embodiments of the foregoing figures.

Referring now to FIG. 9, the first notification of notification queue 928 is {1,1} followed by a second notification {2,3}. A reader of shared memory 908, for example, reader 412 of FIG. 4, picks up the first notification and accesses entry 1 (or offset 1), at region 1, which is maintaining entry data "Vrf2, Data X2, ViaMetricStatusByProtocol[ ]" with an associated metadata field (not shown) indicating the parent location identifier as {0,0} (region 0, offset 0). That is, the root object of the hierarchy to which entry data Vrf2, Data X2, ViaMetricStatusByProtocol[ ] belongs is denoted by this special location identifier, as shown at a reader local (storage) heap state 902 in FIG. 9. In an example embodiment, the reader local storage may be a heap storage type, as presumed in the example of FIGS. 10-12. Reader local storage need not be a heap storage type, but a heap storage typically makes for faster processing relative to, for example, a shared memory storage type. In some embodiments, by way of example, the reader hierarchy states, at the reader local storage (or heap), are shown sequentially at 902 in FIG. 10, 904 in FIG. 11, and 906 in FIG. 12, and reflect the state of reader local storage 442 of FIG. 4 as the foregoing states are reader built.

In some embodiments where the root object is maintained by a writer, such as the example of FIGS. 9-12, the location of the root object in shared memory may be at a region, offset pair entry location that is empty or with no meaningful data yet the entry is reserved for the root object as though the root object is maintained at the designated location for reference by children of the hierarchy to which the root object belongs. In some embodiments, a predetermined entry of at least some regions is reserved exclusively for root objects. In the example of FIGS. 9-12, entry '0' of at least some of the regions, including region '0', is reserved for root objects.

Figure 10:
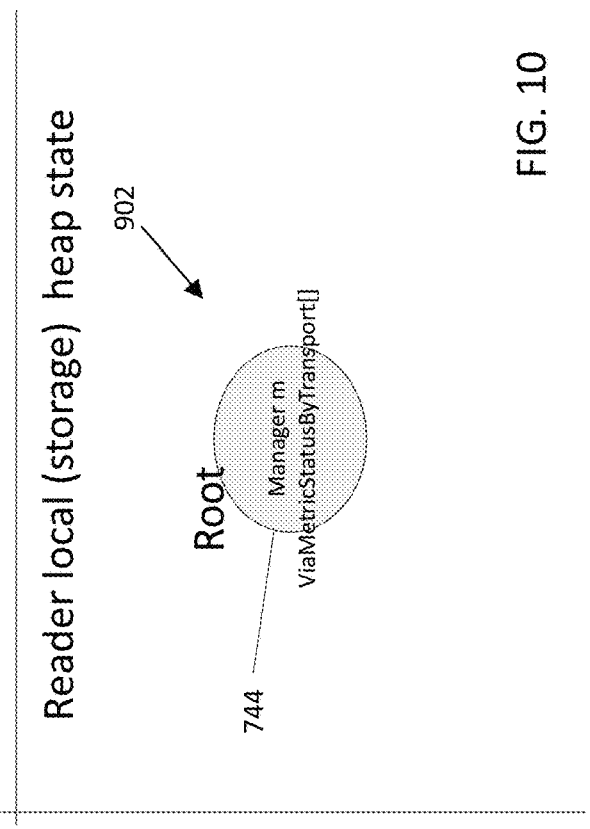
Figure 11:
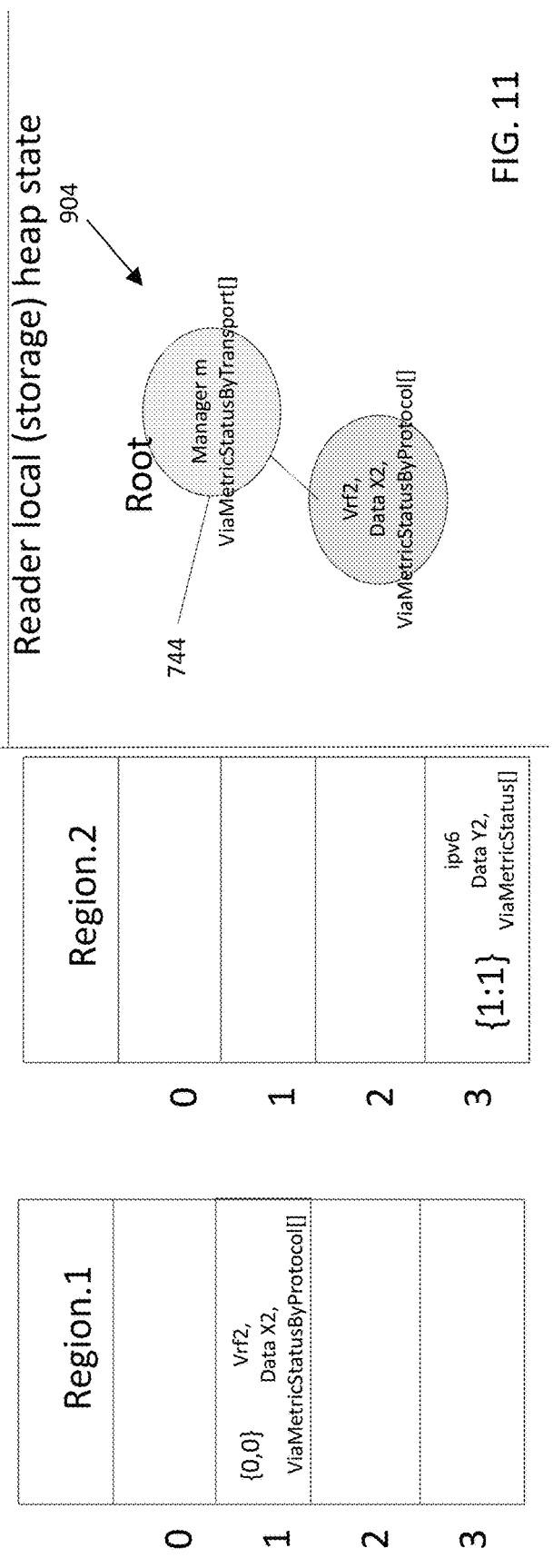
Figure 12:
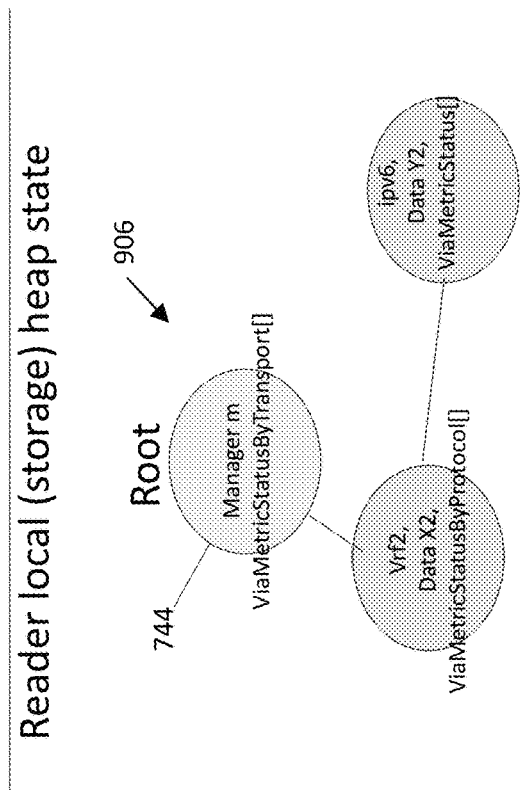

With continued reference to reader 412 of FIG. 4, a reader for the following discussion of FIGS. 10-12, namely reader 412, now knows that the root object 744 (FIG. 7) is located at {0,0}. Accordingly, reader 412 mirrors the same root object in its local hierarchy in its local storage, as shown in FIG. 10, at time t=0.

At t=t1, as shown in FIG. 11, after having processed the first notification of notification queue 928, reader 412 links the entry data Vrf2, Data X2, ViaMetricStatusByProtocol[ ] to root object 744 based on the parent location identifier of the metadata field associated with entry data Vrf2, Data X2, ViaMetricStatusByProtocol[ ], at {0,0}.

The second notification, {2,3}, of notification queue 928, references region 2, entry 3, which houses entry data ipv6, Data Y2, ViaMetricStatus. Given that the parent location identifier of the entry metadata field associated with entry data, ipv6, Data Y2, ViaMetricStatus, is presumed {1,1}, reader 412 learns that the entry data ipv6, Data Y2, ViaMetricStatus corresponds to a child object of the parent object located at region 1, entry 1, and adds the child object to its hierarchical state data structure as shown at a reader local (storage) heap state 904 in FIG. 11. That is, reader 412, having processed the first notification in notification queue 928, at time t=t2, referencing location {1,1}, now links the entry data ipv6, Data Y2, ViaMetricStatus to its parent, Vrf2, Data X2, ViaMetricStatusByProtocol[ ], mirroring a similar association in a corresponding hierarchy (not shown in FIGS. 9-12) in shared memory 908, as shown at a reader local (storage) heap state 906 in FIG. 12. Having processed the first and second notifications of notification queue 928, reader 412 proceeds to process a third notification of notification queue 928 (not shown) and so on. In some embodiments, readers may process notifications of notification queue 928 in a sequential order, as described, for example, with reference to FIGS. 9-12 but readers need not process notifications in a sequential order. In some embodiments, readers may process notifications of notification queue 928 in a non-sequential order. For example, readers may process every other notification or implement other patterns of processing notifications.

Figure 13:
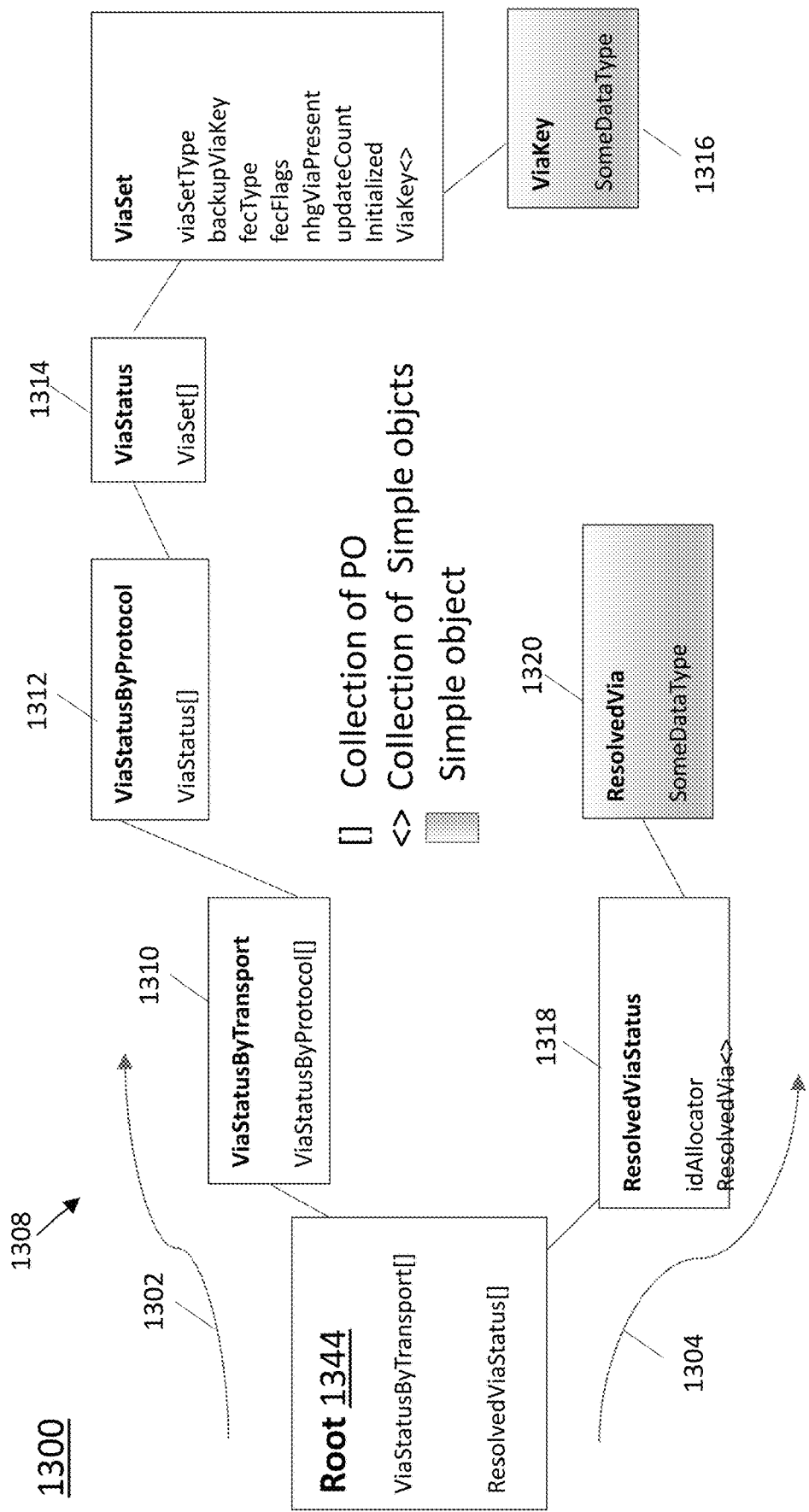
FIG. 13 shows an illustrative diagram of a hierarchical state sharing system 1300, in accordance with some embodiments of the disclosure.

In some embodiments, a single root object can serve more than one hierarchical state data structure, an example of which is shown in FIG. 13. FIG. 13 is an illustrative diagram of a hierarchical state sharing system. In FIG. 13, a hierarchical state sharing system 1300 is disclosed, in accordance with an embodiment of the disclosure. A shared memory 1308 is shown to include a root object 1344 serving as root object to two independent hierarchical state data structures, a hierarchical state data structure 1302 and a hierarchical state data structure 1304. In some embodiments, root object 1344 may serve more than two hierarchical state data structures. Hierarchical state data structure 1302 is keyed by ViaStatusByTransport[ ], in hierarchical state data structure 710 of FIG. 7, and independent hierarchical state data structure 1304 is keyed by ResolvedViaStatus[ ]. Data structures 1302 include parent object collections 1310, 1312, and 1314, each at a different hierarchical level, and simple object 1316 at yet a different hierarchical level of the corresponding hierarchy of data structure 1302. Data structure 1304 includes a simple object collection 1318 and a simple object 1320, each at different levels of hierarchical state data structure 1304.

In hierarchical state sharing systems with one or more data structures sharing a common root, such as the embodiment of FIG. 13, efficiency and memory preservation may stand to realize greater gains than systems with a root per hierarchical state data structure. Because the root encompasses a single writer manager, not only do overall memory requirements reduce, greater efficiency may be realized for the same reason because a single writer manager has control of the shared memory space and the hierarchical state data structures can comingle in that same space. All hierarchies can share the notifications of a common notification queue, further leading to greater efficiency gains. On the other hand, because all hierarchy notifications are equally served, no hierarchy priority allocation may be effectively realized with a single root-sharing arrangement. For example, in a scenario where a particular hierarchy warrants a higher priority than another hierarchy with a common root object, the reader must nevertheless at least pick up, and in some cases, process each state. Accordingly, root object sharing and perhaps even the number of hierarchies sharing a root object may be a matter of design choice based on the particular environment for which the hierarchies are built.

Figure 14:
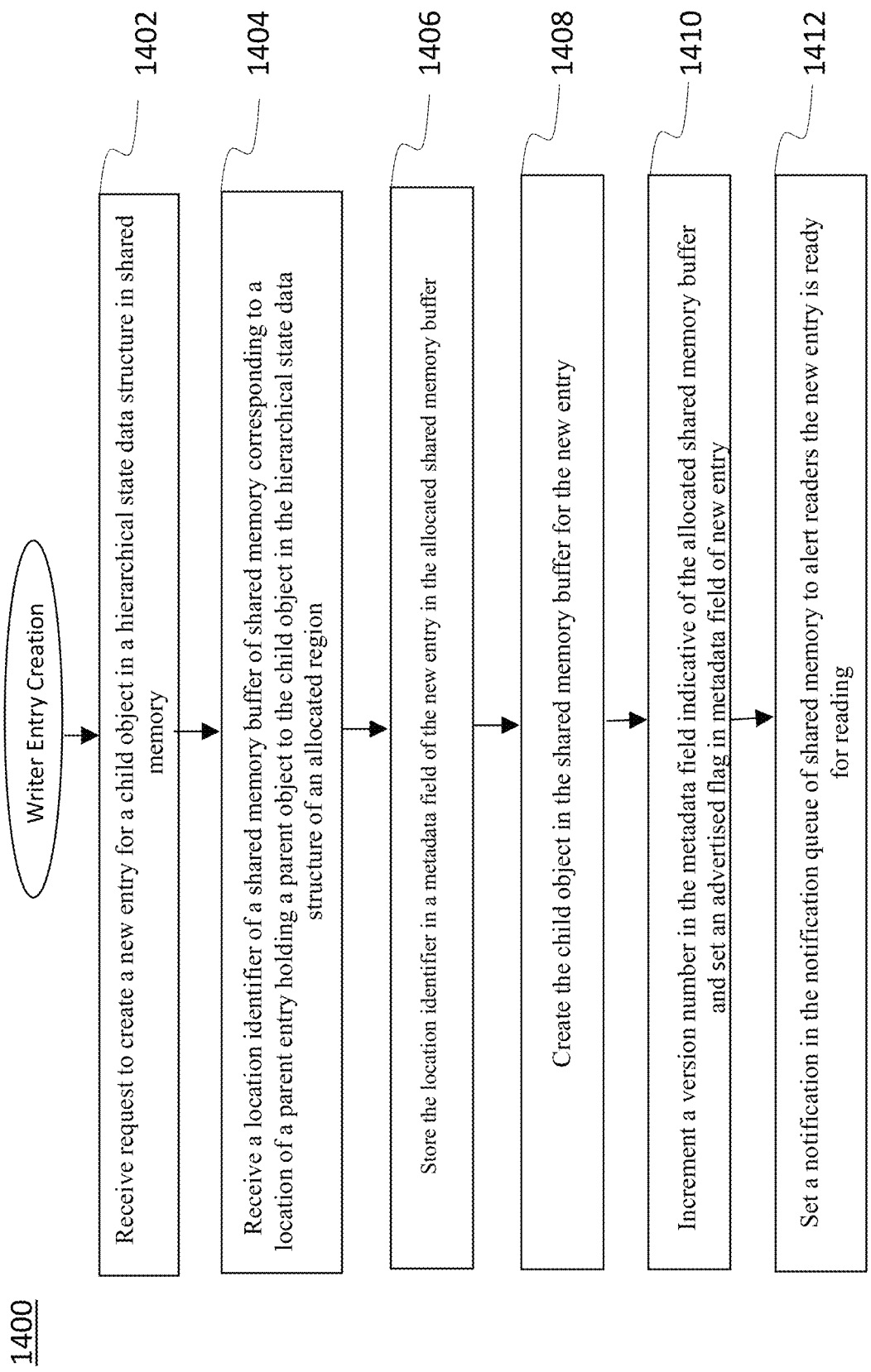
FIG. 14 shows a flowchart of an illustrative process for creating an entry in a shared memory of a hierarchical state sharing system, in accordance with some embodiments of the disclosure.

FIG. 14 shows a flowchart of an illustrative process 1400 for creating an entry in a shared memory of a hierarchical state sharing system, in accordance with some embodiments of the disclosure. In some embodiments, process 1400 may be implemented by systems 100, 200, and 400-900 of FIGS. 1, 2, and 3-9. In some embodiments, process 1400 may be implemented by hierarchical state sharing systems other than those shown and described herein. In an example embodiment, a writer, such as writer 410 of FIG. 4, may carry out the steps of process 1400. In some embodiments, a writer manager of a writer agent, for example, writer manager 426 of FIG. 4 may carry out the steps of process 1400. In some embodiments, other writers or other types of writers may carry out the steps of process 1400.

At step 1402 of process 1400, writer 410 receives a request to create a new entry for a child object in a hierarchical state data structure in a shared memory, such as shared memory 408. Writer 410 may receive such a request from processes accessing shared memory states. For example, writer manager 426 of FIG. 4 may receive a request for a new entry from writer 410 because writer 410 may determine that another route is required for insertion into a shared memory hierarchical state data structure.

Writer 410 makes a request of writer manager 426 to perform the route insertion and writer manager 426 faithfully creates the new entry, for example, by allocating a shared memory buffer of a region in shared memory 408 with an entry size adequate to house the new route insertion entry data.

At step 1404 of process 1400, in response to successful allocation of the shared memory buffer for the new entry from writer manager 426, writer 410 receives a location identifier of the allocated shared memory buffer of the shared memory from writer manager 426 that is linked to a location of a parent entry holding a parent object to the child object in the hierarchical state data structure of the corresponding allocated region, the child object corresponding to the new entry.

Next, at step 1406, writer 410 stores the location identifier from step 1404 in a metadata field of the new entry in the allocated shared memory buffer and creates the child object in the appropriate object location of a corresponding hierarchical state data structure in shared memory 408, at step 1408.

At step 1410 of process 1400, writer 410 increments a version number in a metadata field of the new entry representing a change to the new entry of the allocated shared memory buffer and may additionally set an advertised flag in the metadata field of the new entry. In some embodiments, an advertised flag, when set (or activated), is indicative of the readiness of a corresponding entry (entry data validity) by the reader of the shared memory. Readers recognize a reset (deactivation) state of an advertised flag as representing the corresponding entry data to possibly be invalid, therefore not trustworthy, the readers therefore refrain from updating their corresponding tables and hierarchy accordingly so as to avoid passing on faulty state change information to their respective customers. As a final measure of the entry creation process 1400, at step 1412, writer 410 sets a notification in the notification queue of shared memory to alert readers of shared memory 408 of a possible state change represented by the hierarchy.

Figure 15:
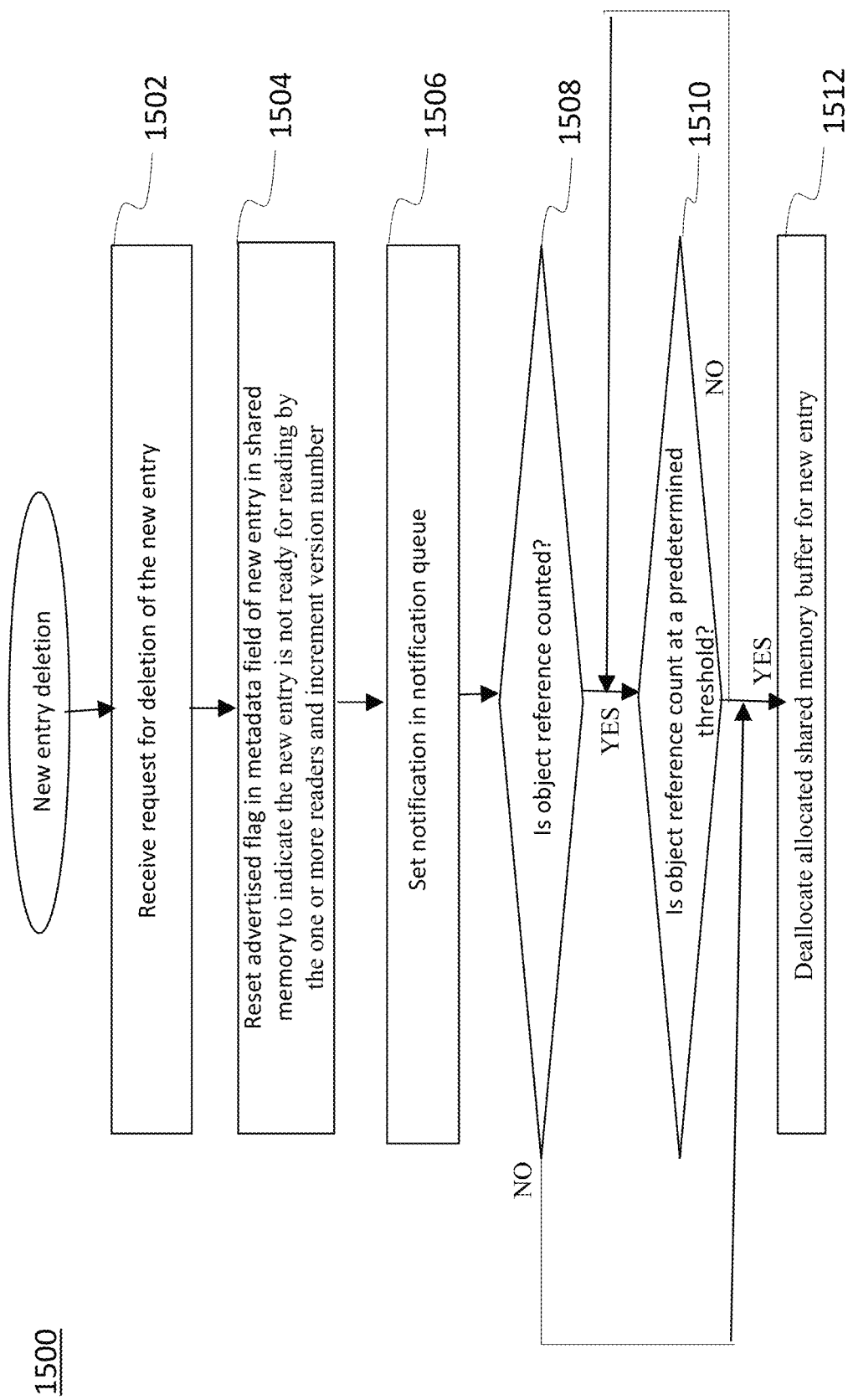
FIG. 15 shows a flowchart of an illustrative process for deleting an entry in a shared memory of a hierarchical state sharing system.

FIG. 15 shows a flowchart of an illustrative process 1500 for deleting an entry in a shared memory of a hierarchical state sharing system, in accordance with some embodiments of the disclosure. In some embodiments, process 1500 may be implemented by systems 100, 200, and 400-900 of FIGS. 1, 2, and 4-9. In some embodiments, process 1500 may be implemented by hierarchical state sharing systems other than those shown and described herein. In an example embodiment, a writer, such as writer 410 of FIG. 4, may carry out the steps of process 1500. Process 1500 picks up from the end of process 1400 and includes steps for removal of the new entry created by process 1400.

At step 1502 of process 1500, writer 410 receives a request for deletion of the new entry, as described in reference to step 1402 of process 1400. Next, at step 1504, writer 410 resets the advertised flag in the metadata field of the new entry in shared memory 408 to indicate the new entry is not ready for reading by the one or more readers and increments a version number, for example, the version number of version field 606 shown and discussed relative to FIG. 6, in the metadata field of the new entry. Next, at step 1506, writer 410 sets a notification in the notification queue of shared memory 408 to alert the readers of shared memory 408 of the new state of the new entry being an invalid state and not recommended for proper reading to prevent readers from copying the new entry.

In some embodiments, each time an entry is added or deleted, a corresponding version number for the entry in the metadata field of the entry in shared memory is incremented. In other embodiments, a different process may be implemented for maintaining track of the current state of an entry.

At step 1508 of process 1500, if the object of the new entry is reference-counted data, process 1500 proceeds to step 1510 and if it is not reference-counted data, process 1500 proceeds to step 1512. At step 1510, writer 410 checks the reference count of the object against a predetermined threshold. For example, the reference count may be decremented each time a reference to the object is removed and the writer detects when a given number of the references are removed. In some embodiments, at step 1510, writer 410 checks for the object reference count to be at the predetermined threshold value '0', in other words, whether all references to the object have been removed. But the predetermined threshold need not be '0' and can be a value greater than '0'. If the determination at step 1510 yields a positive result, process 1500 proceeds to step 1512, otherwise, writer 410 waits for the reference count to reach the predetermined threshold. In some embodiments, if the number of references to the object does not reach a threshold, for example without limitation, '0', prior to notification to the readers of the object removal, a client in the writer process holding an external reference (e.g., smart pointer) to the object may cause the readers to learn about a seemingly valid child object without having learned of the parent of the child object (prior to the notification) and may therefore risk misdirecting the readers. Other scenarios may cause a reader to learn of a seemingly valid child object, yet in actuality an invalid child object. This may happen, for example, when a parent object is known to be the parent of a child object yet the reader receives the same location identifier of the known parent object again in a subsequent notification but due to notification coalescing, the parent object of the subsequent notification is not the right parent object to the child object and the parent object the reader knows about (the old parent object), which has been since deleted, and a new parent object has taken its location. Various embodiments and methods disclosed herein take precautions against these types of scenarios and ensure that the reader does not attempt to associate the child object with the deleted (old) parent object, otherwise, the reader process is at risk of crashing causing a possible network traffic outage, for example. In some embodiments, the reader resorts to its local verification tables prior to certain object entry operations to guard against the forgoing scenarios.

With continued reference to FIG. 15, at step 1512, writer 410 deallocates the previously allocated shared memory buffer for the new entry.

Figure 16:
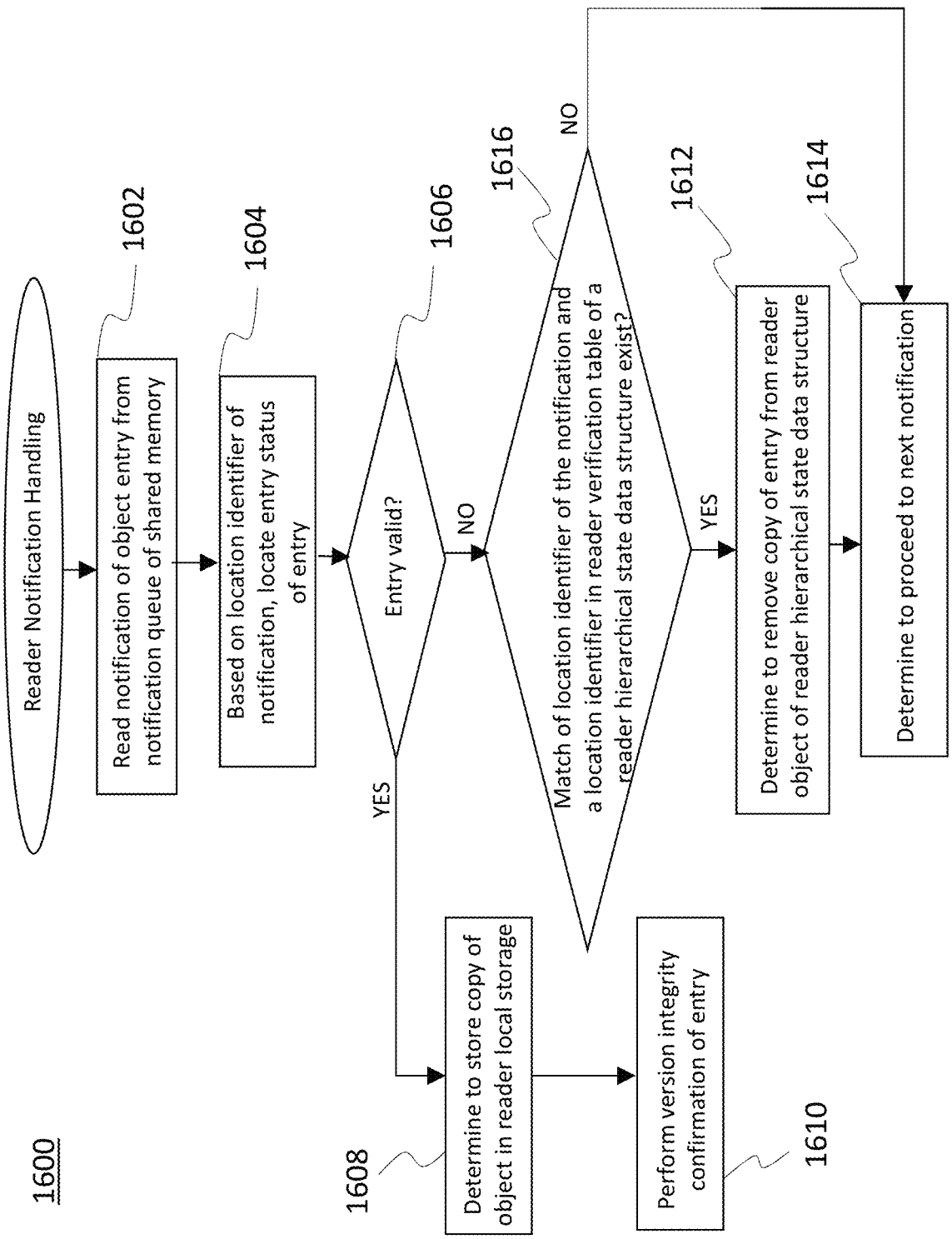
FIG. 16 is a flowchart of a detailed illustrative process for handling a notification in a shared memory of a hierarchical state sharing system, in accordance with some embodiments of the disclosure.

FIG. 16 shows a flowchart of an illustrative process 1600 for handling a notification of a shared memory of a hierarchical state sharing system, in accordance with some embodiments of the disclosure. In some embodiments, process 1600 may be implemented by systems 100, 200, and 400-900 of FIGS. 1, 2, and 3-9. In some embodiments, process 1600 may be implemented by hierarchical state sharing systems other than those shown and described herein. In an example embodiment, a reader, such as reader 412 of FIG. 4 may carry out the steps of process 1600.

At step 1602 of process 1600, reader 412 reads a notification relating to an object entry from a notification queue (e.g., notification queue 428 of shared memory 408). Next, at step 1604, based on the location identifier of the notification, reader 412 locates the entry status of the entry corresponding to the location identifier of step 1602 from shared memory. At step 1606, reader 412 determines whether the entry data is valid based on the read status entry.

In some embodiments, the entry data is considered valid if the corresponding advertised flag in the metadata field is set (or activated), as described above. If at step 1606, reader 412 determines the entry data is valid, process 1600 proceeds to step 1608, otherwise, process 1600 proceeds to step 1616.

At step 1608, reader 412 determines to store a copy of the object in the reader local storage, for example storage 442 (FIG. 4), but not yet adding the object to its local hierarchical tree even though the entry data has an associated valid state until reader 412 confirms the entry data has not changed since last read by the reader, by performing a version integrity confirmation process on the at step 1610. An example version integrity confirmation process is presented and discussed relative to FIGS. 20-22 herein.

At step 1616, reader 412 determines whether there is a match between the location identifier of the notification and a location identifier in a reader verification table, for example one of the tables 448 (FIG. 4), in connection with the local reader 412 hierarchical state data structure. If reader 412 finds a match at step 1616, process 1600 proceeds to step 1612 and if reader 412 fails to find a match at step 1616, process 1600 proceeds to step 1614.

At step 1612, reader 412 determines to remove the copy of the entry and removes the corresponding reader object from the corresponding reader hierarchical state data structure (for example, a reader hierarchical state data structure of hierarchical state data structures 450 of FIG. 4). At step 1620, reader 412 determines to proceed to the next notification of the notification queue.

Figure 17:
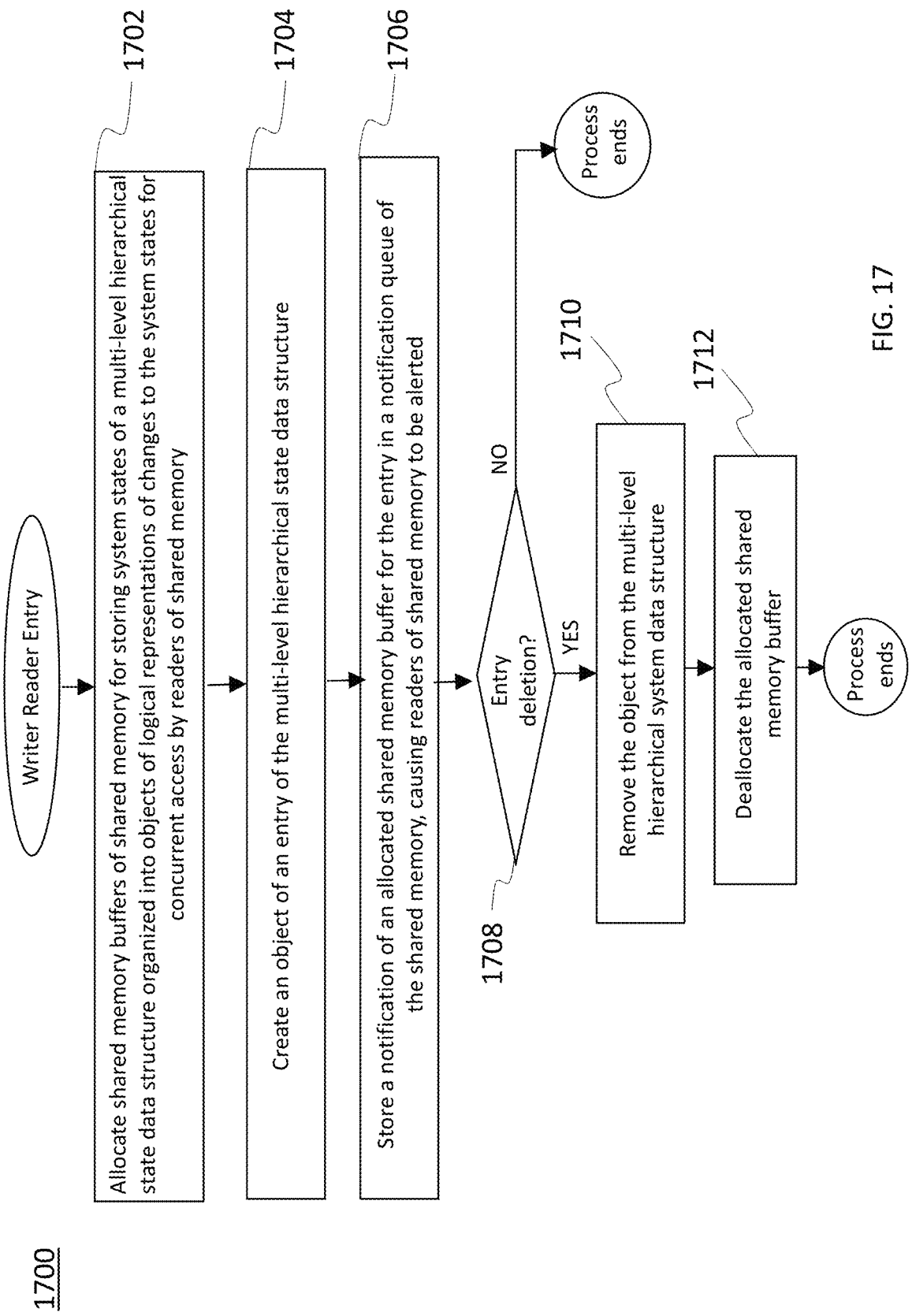
FIG. 17 shows a flowchart of an illustrative process for a writer-reader handling process of an entry in a shared memory of a hierarchical state sharing system, in accordance with some embodiments of the disclosure.

FIG. 17 shows a flowchart of an illustrative process 1700 for a writer-reader handling process of an entry in a shared memory of a hierarchical state sharing system, in accordance with some embodiments of the disclosure. In some embodiments, process 1700 may be implemented by systems 100, 200, and 400-900 of FIGS. 1, 2, and 4-9. In some embodiments, process 1700 may be implemented by hierarchical state sharing systems other than those shown and described herein. In an example embodiment, a writer, such as writer 410, and a reader, such as reader 412, of FIG. 4 may carry out the steps of process 1700. In process 1700, the reader and writer act in concert.

At step 1702, writer 410, for example, allocates shared memory buffers of a shared memory for storing system states of a multi-level hierarchical state data structure organized into objects of logical representations of changes to the system states. The shared memory may be concurrently accessed by writer 410 and readers of the shared memory. At step 1704, writer 410 creates an object of an entry of the multi-level hierarchical state data structure. At step 1706, writer 410 stores a notification of an allocated shared memory buffer for the entry in a notification queue of the shared memory, causing readers of shared memory to be alerted of a modification, addition to, or deletion of the entry.

Next, at step 1708, if reader 412 infers that the notification is for deleting the entry, reader 412 proceeds to step 1710, otherwise, process 1700 ends. In some embodiments, the reader may infer the notification is for deleting the entry by resolving the notification location identifier corresponding to the entry against one or more of the reader verification tables, as earlier described.

The reader may make other decisions that may take the reader down different paths. In some embodiments, reader 412 may make certain decisions about the entry based on the entry status (of the entry metadata field) corresponding to the entry in the shared memory. For example, if the reader determines that the advertised flag in the metadata field of the entry indicates the entry has a valid state (e.g., the advertised flag is set), the reader may then check a second flag in the metadata field of the entry. For example, the reader may check a flag indicative of the entry being in the midst of modified (e.g., lookaside flag) and therefore not suitable for reliable reading yet. In response to the reader determining that the entry has a valid state based on the first flag (e.g., advertised flag) and determining the entry is being modified based on the second flag, the reader determines to drop the notification and determines to proceed to the next notification in the notification queue.

At step 1710, writer 410 removes the object from the multi-level hierarchical system data structure and at step 1712, writer 410 deallocates the allocated shared memory buffer for the entry and process 1700 ends.

Figure 18:
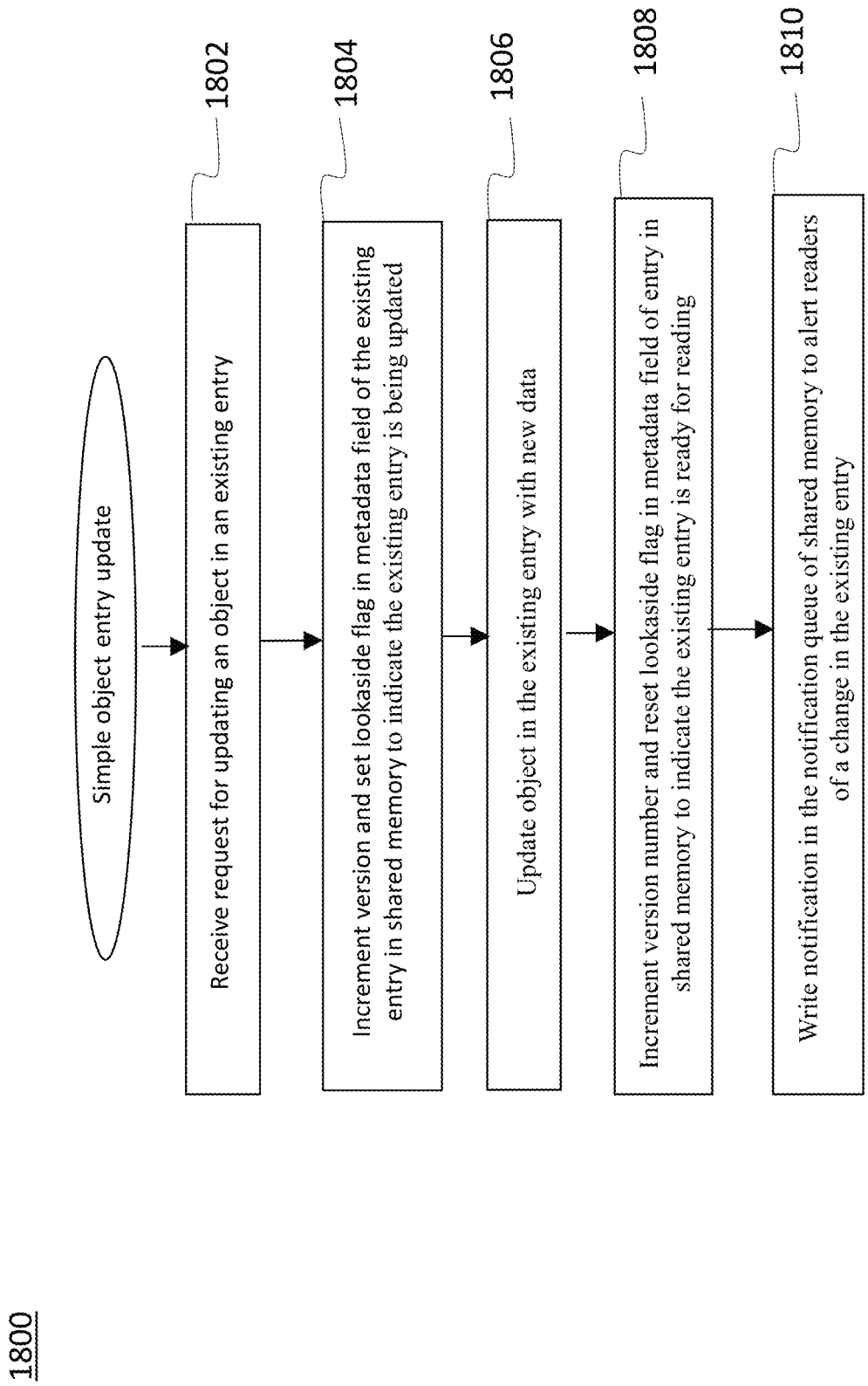
FIG. 18 shows a flowchart of an illustrative process for updating an existing simple object entry in a shared memory of a hierarchical state sharing system, in accordance with some embodiments of the disclosure.

FIG. 18 shows a flowchart of an illustrative process 1800 for updating a simple object entry in a shared memory of a hierarchical state sharing system, in accordance with some embodiments of the disclosure. In some embodiments, process 1800 may be implemented by systems 100, 200, and 400-900 of FIGS. 1, 2, and 4-9. In some embodiments, process 1800 may be implemented by hierarchical state sharing systems other than those shown and described herein. In an example embodiment, a writer, such as writer 410 of FIG. 4 may carry out the steps of process 1800.

At step 1802, writer 410 receives a request for updating a simple object in an existing entry. The request may be analogous to the request of step 1402 of process 1400. Next, at step 1804, writer 410 determines whether a lookaside buffer mode is enabled and if writer 410 decides it is in a lookaside buffer mode. At step 1804, writer 410 increments the version number (in the metadata field) associated with the entry and activates a flag in the metadata field of the entry in shared memory 408, to notify readers of the shared memory that the entry is being modified. For example, writer 410 activates a flag by setting a lookaside flag in the metadata field of the entry.

In some embodiments, the writer may initially write the updated object entry data to a temporary buffer, for example, a lookaside buffer, a temporary holding location in the shared memory, for the purpose of making the updated entry data available to readers of the shared memory while the writer is updating the object entry in the relatively more permanent object entry location of the hierarchical state data structure to prevent the reader to read the existing entry data, which is not current data. The lookaside buffer and the lookaside flag, collectively, steer the reader in the right direction. For example, if the lookaside flag is set (active), in some embodiments, the reader knows to look to the lookaside buffer for the current (or valid) version of the object entry. The lookaside flag is an indication of whether the reader should trust the entry data or to turn to the lookaside buffer for the entry data based on whether or not the existing entry data is being modified by the writer.

Next, at step 1806, writer 410 updates the object of the existing entry in the shared memory with new data. At step 1808, writer 410 increments the version number associated with the entry in the entry metadata field and deactivates (e.g., resets) the lookaside flag (also in the entry metadata field) in the shared memory to indicate to readers of the shared memory that the entry has been updated with new data and the modification is complete, i.e. the entry may be reliably read by readers of the shared memory. At step 1810, writer 410 writes a notification in the notification queue of shared memory 408 to alert the readers of the shared memory of the updated status of the entry. In some embodiments, writer 410 writes the location indicator of the entry into the notification queue at stop 1810.

Figure 19:
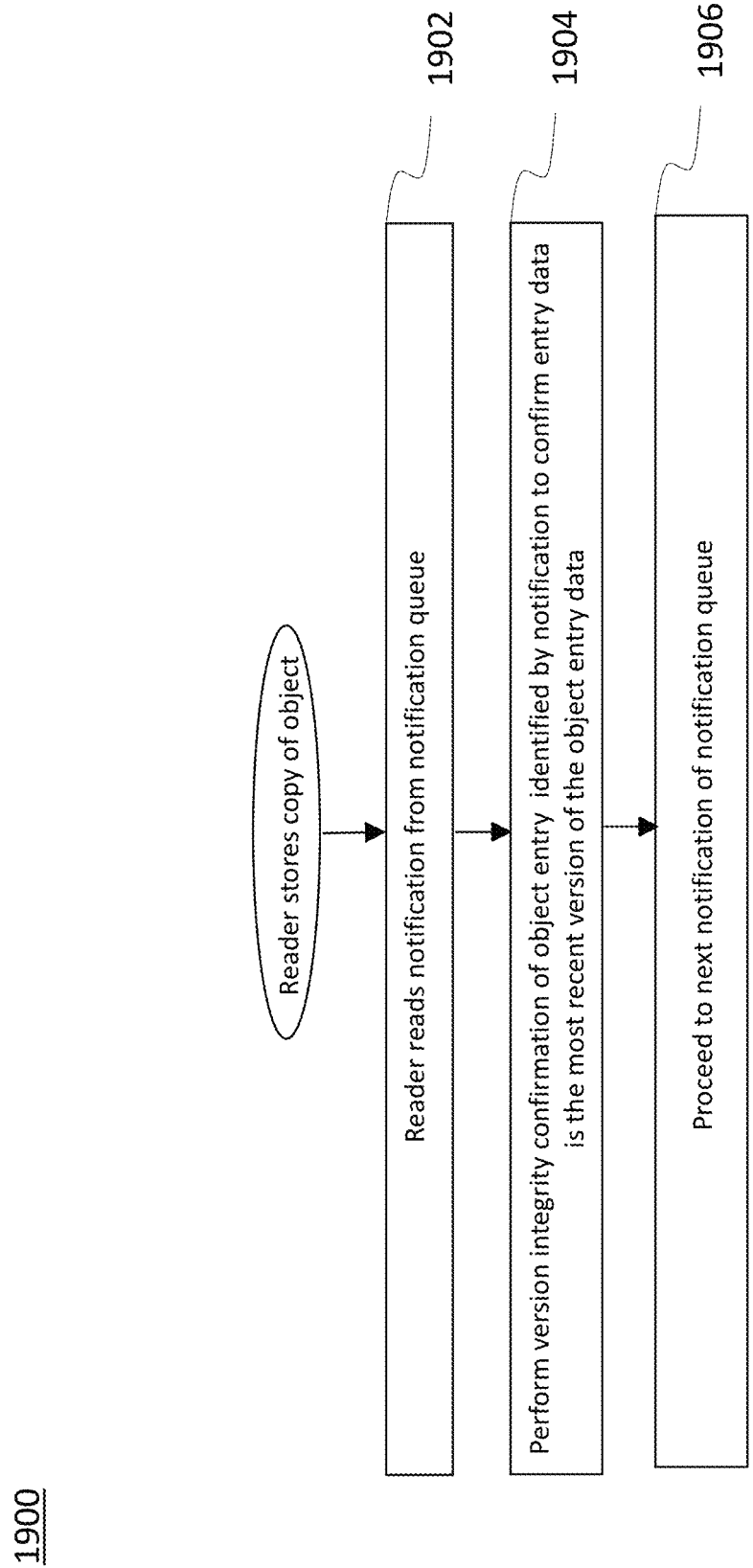
FIG. 19 shows a flowchart of an illustrative process for storing a copy of an object in a reader local hierarchical state data structure of a hierarchical state sharing system, in accordance with some embodiments of the disclosure.

FIG. 19 shows a flowchart of an illustrative process 1900 for storing a copy of an object in a reader local hierarchical state data structure of a hierarchical state sharing system, in accordance with some embodiments of the disclosure. In some embodiments, process 1900 may be implemented by systems 100, 200, and 400-900 of FIGS. 1, 2, and 4-9. In some embodiments, process 1900 may be implemented by hierarchical state sharing systems other than those shown and described herein. In an example embodiment, a reader, such as reader 412 of FIG. 4 may carry out the steps of process 1900.

At step 1902, reader 412 reads a notification from the notification queue of shared memory 408. Next, at step 1904, reader 412 performs a version integrity confirmation of the object entry identified by the notification to confirm the object entry data is the most current version of the data. An example of a version integrity confirmation process is provided by the process 2000 of FIGS. 20-22 and the related discussion below. In some embodiments, version integrity confirmation further confirms a valid state of the entry data, as discussed above. In some embodiments, status entry flags and the version number corresponding to a particular entry are written and read at the same time. For example, as shown in FIG. 6, a metadata field of the entry may have a four-byte value, some of which is designated for the version number and some of which is designated for entry status flags, such as the advertised, lookaside and occupied flags, or a subset of these flags such that when the four-byte value is written, the value indicates the version number and the entry status and when the four-byte value is read, the read value indicates the version number and the entry status. At step 1906, reader 412 proceeds to the next notification in the notification queue.

Figure 20:
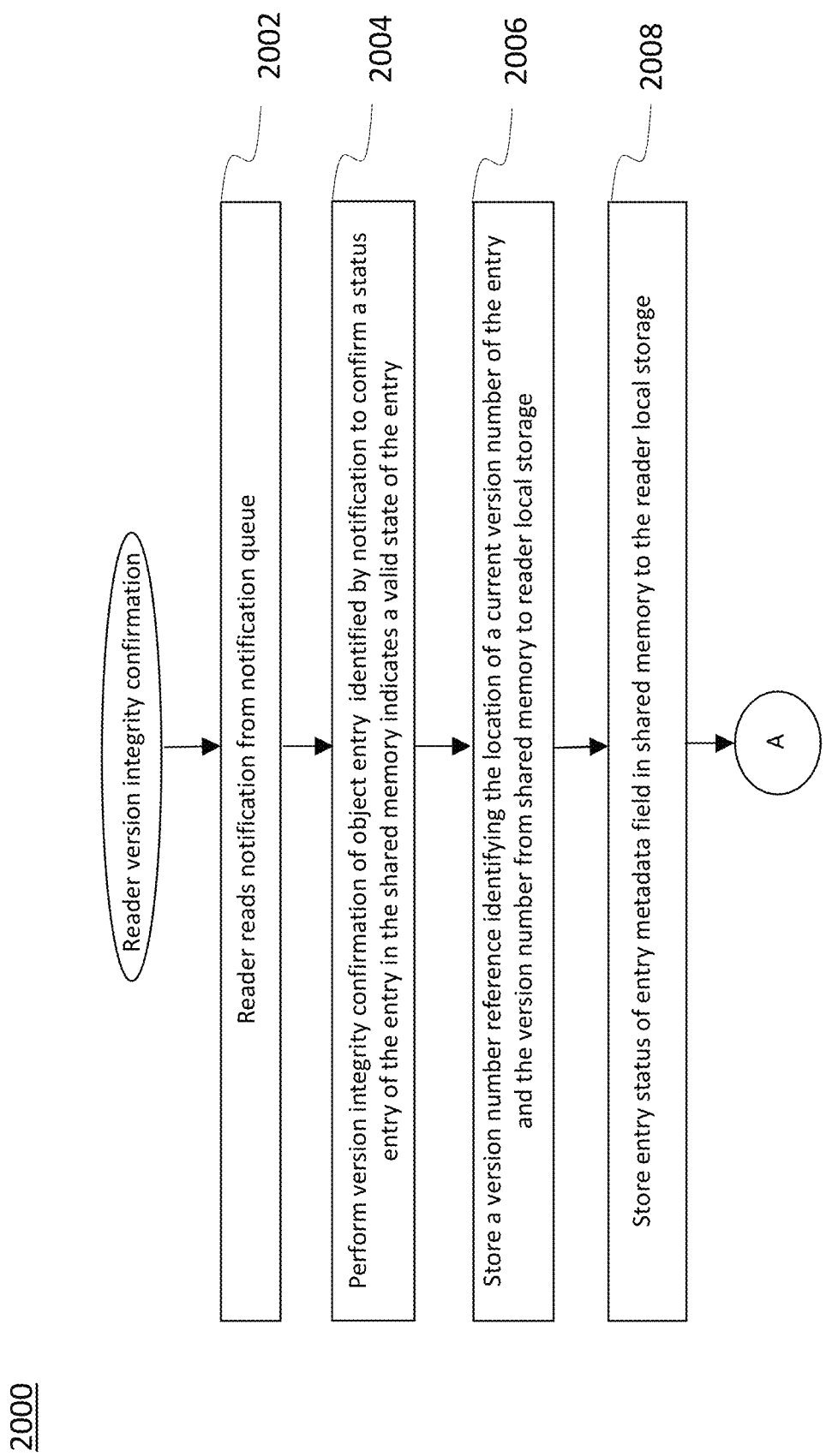
FIGS. 20-22 show a flowchart of an illustrative process for performing a version integrity confirmation process in a hierarchical state sharing system, in accordance with some embodiments of the disclosure.
Figure 21:
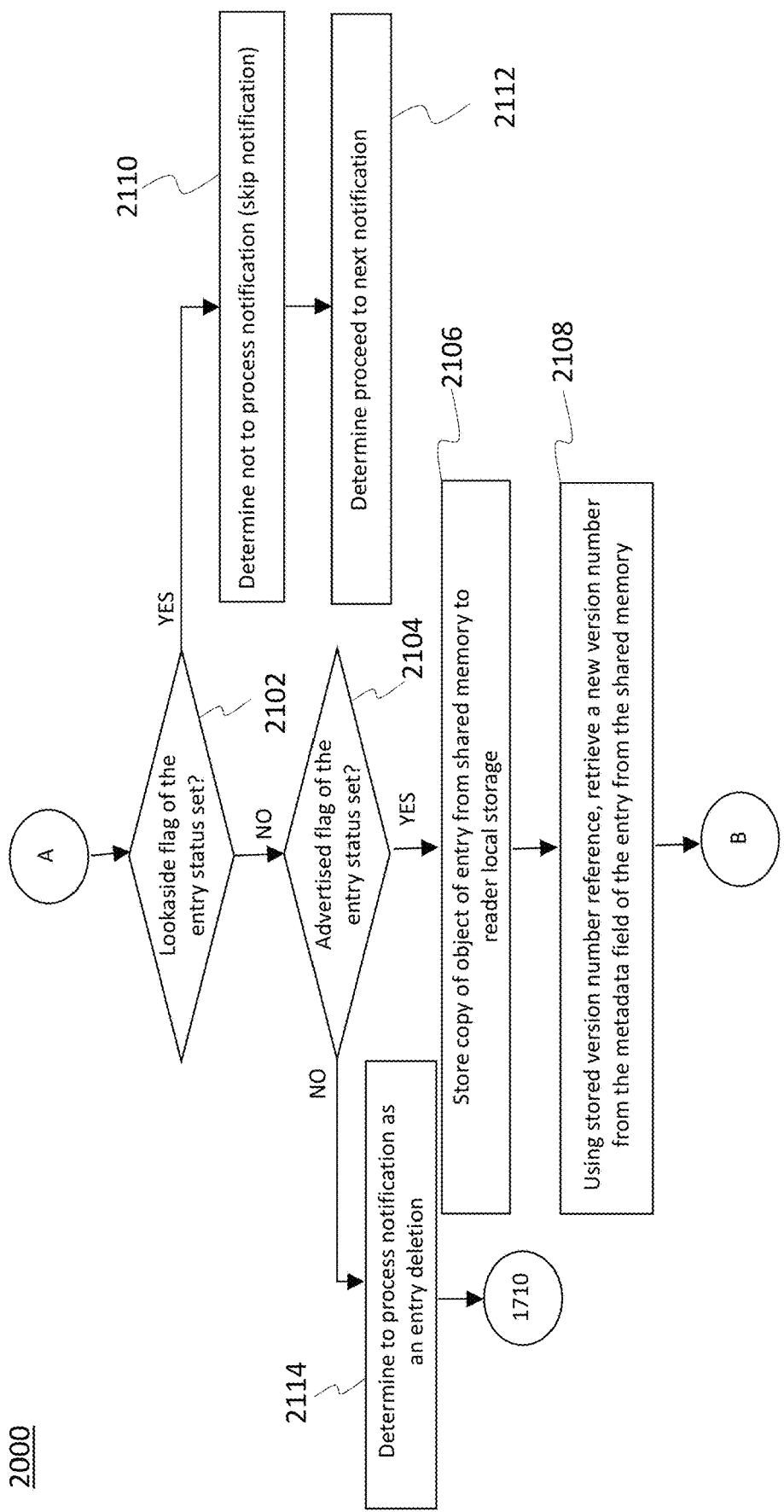
Figure 22:
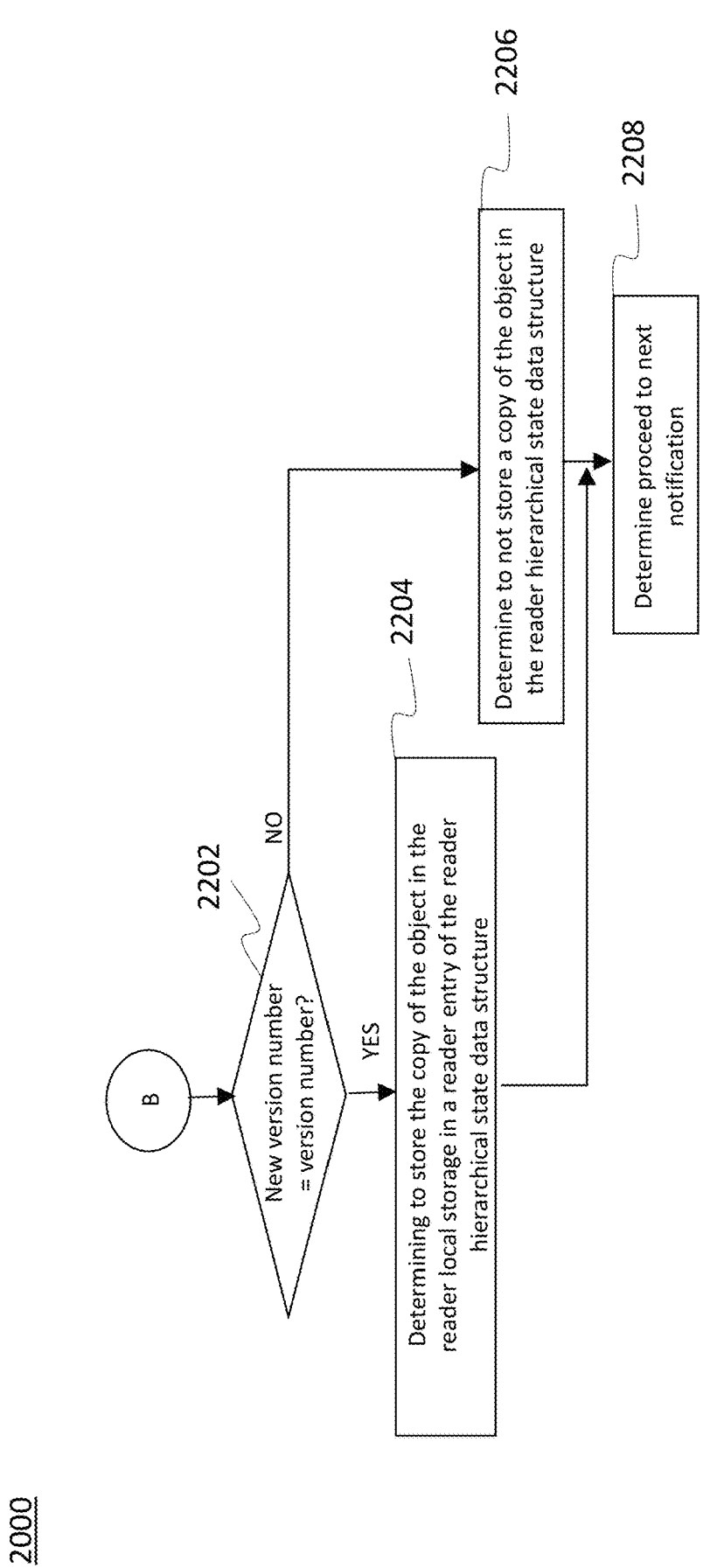

FIGS. 20-22 show a flowchart of an illustrative process 2000 for performing a version integrity confirmation process in a hierarchical state sharing system, in accordance with some embodiments of the disclosure. In some embodiments, process 2000 may be implemented by systems 100, 200, and 400-900 of FIGS. 1, 2, and 3-9. In some embodiments, process 2000 may be implemented by hierarchical state sharing systems other than those shown and described herein. In an example embodiment, a reader, such as reader 412 of FIG. 4 may carry out the steps of process 2000.

At step 2002, reader 412 reads a notification from the notification queue of the shared memory, for example, shared memory 408. Next, at step 2004, reader 412 performs version integrity confirmation of the object entry identified by the read notification to confirm the entry data is the most recent version of the data. In some embodiments, version integrity confirmation further confirms a valid state of the entry data, as discussed above.

Next, at step 2006, reader 412 stores a version number reference identifying a location of a current version of the entry from the shared memory in the reader local storage, for example reader location storage 442 (FIG. 4). Reader 412 also stores the version number identified by the version number reference from the metadata field of the entry in the shared memory to its local storage, for example, reader local storage 442. Reader 412 saves the pointer to the version number of the current entry data to be able to find the version number at a future time and check it against the current version number for an integrity check. Reader 412 may carry out this integrity confirmation process, i.e. steps 2004 of FIG. 20 through 2208 of FIG. 22, to confirm the integrity of the entry data each time reader 412 reads an entry from the shared memory.

At step 2008, reader 412 stores the entry status of the metadata field of the entry in the shared memory to its local storage, for example, reader local storage 442 (FIG. 4), and process 2000 proceeds to step 2102 of FIG. 21. The tables of reader local storage 442 may be a single table or a combination of tables, for example three tables as earlier discussed, with sections indexed according to the data to be tested.

At step 2102 of FIG. 21 (of process 2000), reader 412 determines whether the lookaside flag of the entry status is set. In response to the reader 412 determining that the lookaside flag is set (the entry data is being modified by the writer of the shared memory), process 2000 proceeds to step 2110, otherwise, process 2000 proceeds to step 2104.

At step 2110, reader 412 determines to stop processing the notification picked at step 2002 (FIG. 20) and to proceed to the next notification in the notification queue, at step 2112.

At step 2104, the entry status of the entry is checked for validity of the entry data. For example, an advertised flag of the entry status, when activated, may indicate the entry data is valid. If a determination is made at step 2104 that the entry data is not valid (e.g., the advertised flag is not set), process 2000 proceeds to step 2114, otherwise, process 2000 proceeds to step 2106. At step 2114, reader 412 determines that the notification picked up at step 2002 is for entry deletion and proceeds to perform steps to delete the entry. For example, reader 412 may proceed to step 1616 of FIG. 16 to carry out the steps of an entry deletion process.

At step 2106, reader 412 may store a copy of the object from the entry from shared memory 408 to its local storage, for example, to reader local storage 442 of FIG. 4. Next, process 2000 proceeds to step 2108. Using the stored version number reference (from step 2006 of process 2000), reader 412 retrieves a new version number from the current metadata field of the entry from the shared memory. Reader 412 may do so to try to determine whether the data has been altered or whether it remains the same from the time the version number was initially read from shared memory 408, at step 2006 of process 2000.

After step 2108, process 2000 proceeds to step 2202 of FIG. 22. At step 2202, reader 412 compares the new version number of the entry, retrieved at step 2108 of process 2000, to the stored version number of the entry, at step 2006. If the current version number and the stored version number match, process 2000 proceeds to step 2204, otherwise, process 2000 proceeds to step 2206. At step 2204, reader 412 determines to commit the stored copy of the object from step 2106 to a reader entry of the reader hierarchical state data structure. At step 2206, reader 412 determines to not store a copy of the entry in its local hierarchy, for example, a reader hierarchical state data structure of the reader hierarchical state data structures 422 (FIG. 4) because the entry has changed since reader 412 last read it and cannot be trusted. After step 2206, reader 412 proceeds to step 2208 and determines to proceed to the next notification. Reader 412 essentially does not continue to process the notification. When reader 412 does not continue to process a notification to its completion or skips processing a notification, reader 412 may not report a changed state to its clients for various reasons, for example and without limitation, lack of trust in the integrity of the entry data. On the other hand, when reader 412 processes a notification to its completion, reader 412 may report the state represented at the completion of the notification processing to its clients because the data is reliable to report.

Although a particular order and flow of steps is depicted in each of FIGS. 14-22, it will be understood that in some embodiments one or more of the steps in each figure may be suitably modified, moved, removed, or added, and that the flow depicted in these figures may be modified.

Figure 23:
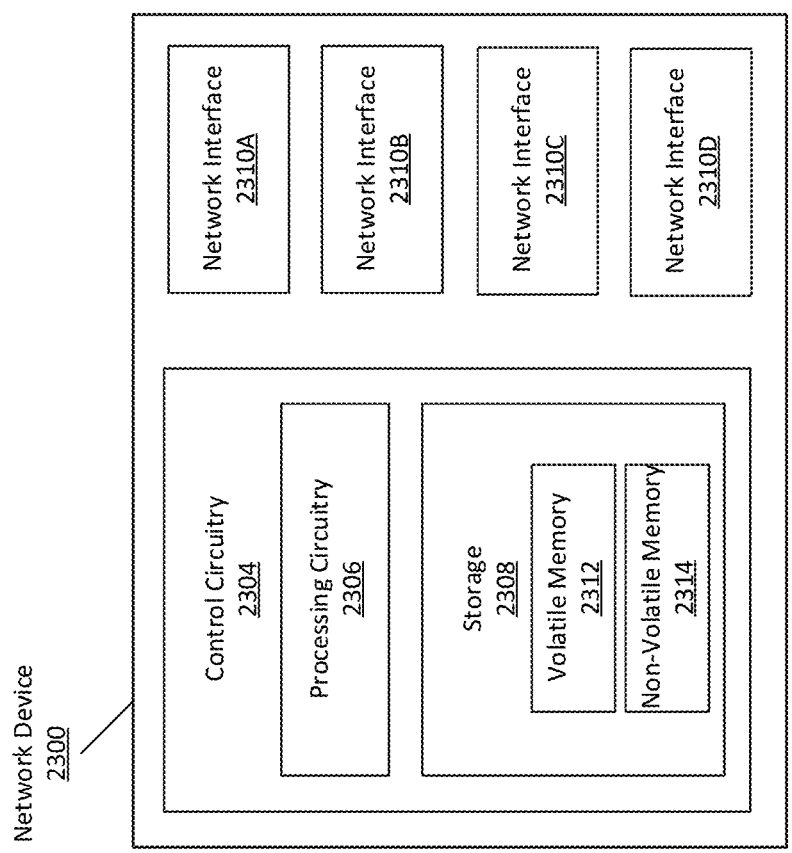
FIG. 23 shows a diagram of an illustrative network device of the system of FIG. 2, in accordance with some embodiments of the disclosure.

FIG. 23 shows a generalized embodiment of a network device 2300. As depicted, network device 2300 may be a router, a switch, and/or any other network device configured to transmit states of a system through a shared memory to readers of the shared memory such as by performing adding, deleting and modifying entries of objects hierarchically organized in the shared memory, the objects logically representing the system states. Those skilled in the art will recognize that switch 230 of FIG. 2 may be implemented as network device 2300. Network device 2300 may receive via a network interface (e.g., network interface 2310A), network traffic route configuration data, dynamically changing to reflect the dynamic route configuration of a corresponding network traffic, store the configuration data as system states in the form of hierarchical state data structures of objects of logical representation of the changing system states (e.g., hierarchical state data structure 222) in storage 2308 for readers of storage 2308 (e.g., data plane 204 processes or processes of other network devices not shown in FIG. 23). In some embodiments, network device 2300 performs storage of the hierarchical data structures with control circuitry 2304, which includes processing circuitry 2306 and storage 2308. In some embodiments, storage 2308 may be configured as a shared memory, for example, shared memory 108, 208, 408, 508, 608, 712, 804, or 908 of FIGS. 1, 2, 4, 5, 6, 7, 8, and 9-12, respectively. In some embodiments, execution of a writer program code, stored in storage 2308, by processing circuitry 2306, implements a writer (e.g., writer 410 of FIG. 4), writer agent (e.g., writer agent 110 and writer agent 210 of FIGS. 1 and 2), and writer manager (e.g., writer manager 126 and writer manager 226) of the shared memory. In some embodiments, execution of a reader program code, stored in storage 2308, by processing circuitry 2306, implements a reader (e.g., reader 412 of FIG. 4), reader agent (e.g., reader agents 1-N of FIGS. 1 and 2), and reader manager (e.g., reader managers 1-N of FIGS. 1 and 2) of the shared memory.

While network device 2300 is shown as including four network interfaces (e.g., network interfaces 2310A, 2310B, 2310C, and 2310D), this is merely illustrative, and those skilled in the art will appreciate that network device 2300 may include any number of network interfaces, and that the network interfaces may be of any type of wired or wireless network interface, such as RJ45 ethernet ports, a coaxial ports, logical ports, wireless interfaces (e.g., 802.11x interfaces, BLUETOOTH interfaces, cellular interfaces, etc.)

Control circuitry 2304 may be based on any suitable processing circuitry, such as processing circuitry 2306. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, octa-core, or any suitable number of cores). In some embodiments, processing circuitry is distributed across multiple separate processors or processing units, for example, multiple of the same type of processing units (e.g., two INTEL CORE i7 processors) or multiple different processors (e.g., an INTEL CORE i5 processor and an INTEL CORE i7 processor). In some embodiments, control circuitry 2304 executes instructions for performing various operations as a producer would perform on a shared memory, as described above with reference to FIGS. 14-22. For example, control circuitry 2304 may perform the writer processes or certain writer steps of the processes of FIGS. 14-22. In some embodiments, control circuitry 2304 executes instructions for performing various operations as a consumer would perform on a shared memory, as described above with reference to FIGS. 14-22. For example, control circuitry 2304 may perform the reader processes or certain reader steps of the processes of FIGS. 14-22.

Storage 2308 may include volatile random-access memory (RAM) 2312, which does not retain its contents when power is turned off, and non-volatile RAM 2314, which does retain its contents when power is turned off. In some embodiments, storage 2308 may be an electronic storage device that is part of control circuitry 2304. As referred to herein, the phrase "electronic storage device" or "storage device" should be understood to mean any device for storing electronic data, computer software, instructions, and/or firmware, such as random-access memory, content-addressable memory, hard drives, optical drives, solid state devices, quantum storage devices, or any other suitable fixed or removable storage devices, and/or any combination of the same. In some embodiments, one or more reader verification tables 448 are stored in storage 2308. In other embodiments, one or more reader verification tables 448 may be stored on a separate device and a link to table 448 may be stored in storage 2308. In some embodiments, a root object, such as root object 444 and root object 446, may be stored in storage 2308. In some embodiments, a root object, such as root object 444 and root object 446, may be stored on a separate device and a link to the root object may be stored in storage 2308. In some embodiments, one or more reader hierarchical state data structures, such as reader hierarchical state data structures 450, may be stored in storage 2308. In some embodiments, one or more reader hierarchical state data structures, such as reader hierarchical state data structures 450, may be stored on a separate device and a link to the root object may be stored in storage 2308. The circuitry described herein may execute instructions included in software running on one or more general purpose or specialized processors. Multiple circuits may be provided to handle simultaneous processing functions.

It will be apparent to those of ordinary skill in the art that methods involved in the present invention may be embodied in a computer program product that includes a computer-usable and/or -readable medium. For example, such a computer-usable medium may consist of a read-only memory device, such as a CD-ROM disk or conventional ROM device, or a random-access memory, such as a hard drive device or a computer diskette, having a computer-readable program code stored thereon. It should also be understood that methods, techniques, and processes involved in the present disclosure may be executed using processing circuitry.

The processes discussed above are intended to be illustrative and not limiting. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

What is claimed is:

1. A non-transitory computer-readable medium storing executable instructions to cause one or more processing units to perform a method to allocate a shared memory buffer for a new entry in a shared memory, the method comprising:
receiving, by a writer manager, a request to create the new entry in the shared memory for a first child object in a hierarchical state data structure in the shared memory, wherein:
the new entry in the shared memory comprises one or more shared memory buffers,
the new entry in the shared memory is at a uniquely identifiable location in the shared memory,
the first child object in the hierarchical state data structure in the shared memory is a logical representation of a state of a system, and
in response to a request for an allocation of a shared memory buffer within a region of the shared memory for the new entry in the shared memory, receiving a first location identifier corresponding to a location of a parent entry holding a parent object to the first child object in the hierarchical state data structure of an allocated region of the shared memory; and
creating the first child object in the hierarchical state data structure in the allocated shared memory buffer for the new entry in the shared memory,
wherein:
the new entry in the shared memory is available for concurrent access to one or more readers of the shared memory.

2. The non-transitory computer-readable medium of claim 1, wherein the allocated shared memory buffer remains allocated to the new entry in the shared memory until a number of references to the first child object in the hierarchical state data structure in the allocated shared memory buffer reaches a threshold number of references.

3. The non-transitory computer-readable medium of claim 1, further comprising storing the first location identifier corresponding to the location of the parent entry in a notification of a notification queue in the shared memory, wherein storing the first location identifier corresponding to the location of the parent entry in the notification of the notification queue in the shared memory alerts the one or more readers of the shared memory of a possible change in a state represented by the hierarchical state data structure in the allocated shared memory buffer.

4. The non-transitory computer-readable medium of claim 3, further comprising:
setting an advertised flag in a metadata field of the new entry in the shared memory indicting the new entry in the shared memory is ready for reading by the one or more readers of the shared memory;
in response to receiving a request to delete the first child object in the hierarchical state data structure in the allocated shared memory buffer:
resetting the advertised flag in the metadata field of the new entry in the shared memory to indicate the new entry in the shared memory is not ready for reading by the one or more readers of the shared memory; and
storing the first location identifier corresponding to the location of the parent entry in another notification of the notification queue in the shared memory to alert the one or more readers of the shared memory of a possible change in a state represented by the hierarchical state data structure in the allocated shared memory buffer.

5. The non-transitory computer-readable medium of claim 1, further comprising in response to a successful allocation of the allocated region of the shared memory, incrementing a version number in a metadata field indicative of the allocated shared memory buffer and in response to deallocation of the allocated shared memory buffer from the shared memory, incrementing the version number in the metadata field indicative of the allocated shared memory buffer being deallocated.

6. The non-transitory computer-readable medium of claim 1, wherein one or more parent objects of the hierarchical state data structure of the allocated region of the shared memory are added to the hierarchical state data structure of the allocated region of the shared memory before one or more corresponding child objects are added to the hierarchical state data structure of the allocated region of the shared memory and the one or more corresponding child objects are removed from the hierarchical state data structure of the allocated region of the shared memory before a parent object of a removed child object is removed from the hierarchical state data structure of the allocated region of the shared memory.

7. The non-transitory computer-readable medium of claim 1, wherein entries of objects of the hierarchical state data structure in the shared memory correspond to states of a routing table of a network switch or a network router.

8. The non-transitory computer-readable medium of claim 1, further comprising:
receiving a request for updating an existing entry of a second child object of the hierarchical state data structure in the shared memory, wherein the existing entry of the second child object of the hierarchical state data structure in the shared memory has a valid state and includes an original value representing an attribute state of the system;
setting a lookaside flag in a metadata field of the existing entry of the second child object of the hierarchical state data structure in the shared memory indicative of an invalid state of the existing entry of the second child object of the hierarchical state data structure in the shared memory;
modifying the original value of the existing entry of the second child object of the hierarchical state data structure in the shared memory to an updated value; and
resetting the lookaside flag in the metadata field of the existing entry of the second child object of the hierarchical state data structure in the shared memory indicative of a valid state of the existing entry of the second child object of the hierarchical state data structure in the shared memory.

9. The non-transitory computer-readable medium of claim 8, further comprising prior to setting the lookaside flag in the metadata field of the existing entry of the second child object of the hierarchical state data structure in the shared memory, storing the updated value in a temporary buffer in the shared memory to make the updated value available to the one or more readers of the shared memory while the existing entry of the second child object of the hierarchical state data structure in the shared memory has an invalid state.

10. The non-transitory computer-readable medium of claim 9, further comprising storing a second location identifier in a notification of a notification queue in the shared memory, wherein the second location identifier in the notification of the notification queue in the shared memory alerts the one or more readers of the shared memory of a possible change in a state represented by the hierarchical state data structure in the allocated shared memory buffer.

11. A non-transitory computer-readable medium storing executable instructions to cause one or more processing units to perform a method of processing an entry of an object in a shared memory comprising:

reading a first notification from a notification queue of the shared memory, wherein the first notification from the notification queue of the shared memory represents a change made by a writer manager to a state change in a first state of the entry of the object in a hierarchical state data structure in the shared memory, and wherein the entry of the object in the hierarchical state data structure in the shared memory is a logical representation of a first state of a system;

based on a location identifier of the first notification from the notification queue of the shared memory, locating an entry status corresponding to a status of the entry of the object in the hierarchical state data structure in the shared memory, wherein the location identifier of the first notification from the notification queue of the shared memory identifies a location of the entry of the object in the hierarchical state data structure in the shared memory;

based on the entry status, determining whether or not the entry of the object in the hierarchical state data structure in the shared memory is a valid state of the object in the hierarchical state data structure in the shared memory; and in response to determining the entry of the object in the hierarchical state data structure in the shared memory is a valid state of the object in the hierarchical state data structure in the shared memory, storing a copy of the object in the hierarchical state data structure in the shared memory in a reader entry of a reader local storage of a reader, wherein the reader entry corresponds to a reader object of a reader hierarchical state data structure in the reader local storage of the reader, wherein:

the reader object of the reader hierarchical state data structure in the reader local storage of the reader is in a position in the reader hierarchical state data structure in the reader local storage of the reader corresponds to a like position of the object in the hierarchical state data structure in the shared memory, and the reader hierarchical state data structure in the reader local storage of the reader is a copy of the hierarchical state data structure in the shared memory.

12. The non-transitory computer-readable medium of claim 11, further comprising in response to determining to store a copy of the object in the hierarchical state data structure in the shared memory in a reader entry of the reader local storage of the reader, performing a version integrity confirmation of the entry of the object in the hierarchical state data structure in the shared memory to confirm a status entry of the entry of the object in the hierarchical state data structure in the shared memory indicates a valid state of the entry of the object in the hierarchical state data structure in the shared memory.

13. The non-transitory computer-readable medium of claim 12, wherein performing the version integrity confirmation of the entry of the object in the hierarchical state data structure in the shared memory is in response to reading the first notification from the notification queue of the shared memory, and wherein the version integrity confirmation of the entry of the object in the hierarchical state data structure in the shared memory comprises:

storing a version number reference identifying a location in the shared memory to a version number identifying a current version of the entry of the object in the hierarchical state data structure in the shared memory; and storing an entry status of a metadata field of the entry of the object in the hierarchical state data structure in the shared memory in the reader local storage of the reader;

in response to determining a lookaside flag of the entry status is set, determining to not process the first notification from the notification queue of the shared memory and determining to proceed to a next notification from the notification queue of the shared memory;

in response to determining the lookaside flag of the entry status is not set:

determining whether an advertised flag in the entry status is set;

in response to determining the advertised flag in the entry status is not set, determining to process the first notification from the notification queue of the shared memory as a deletion of the entry of the object in the hierarchical state data structure in the shared memory;

in response to determining the advertised flag in the entry status is set:

storing a copy of the object in the hierarchical state data structure in the shared memory in the reader local storage of the reader;

using the stored version number reference, retrieving a new version number from the metadata field of the entry of the object in the hierarchical state data structure from the shared memory;

in response to determining the new version number and the version number match, determining to store the copy of the object in the hierarchical state data structure in the shared memory in the reader local storage of the reader in a reader entry of the reader hierarchical state data structure in the reader local storage of the reader, wherein the reader entry of the reader hierarchical state data structure in the reader local storage of the reader corresponds to a reader object of the reader hierarchical state data structure in the reader local storage of the reader, and determining to proceed to a next notification from the notification queue of the shared memory; and in response to determining the new version number and the version number do not match, determining to not store the copy of the object in the hierarchical state data structure in the shared memory in the reader local storage of the reader in the reader hierarchical state data structure in the reader local storage of the reader, and determining to stop processing the first notification from the notification queue of the shared memory and determining to proceed to a next notification from the notification queue of the shared memory, wherein:

the storing the version number reference identifying the location in the shared memory to the version number identifying the current version of the entry of the object in the hierarchical state data structure in the shared memory and the storing the entry status of the metadata field of the entry of the object in the hierarchical state data structure in the shared memory in the reader local storage of the reader are performed simultaneously.

14. The non-transitory computer-readable medium of claim 11, further comprising in response to determining the entry of the object in the hierarchical state data structure in the shared memory is a valid state of the object in the hierarchical state data structure in the shared memory:
   determining whether there is an association of the location identifier of the first notification from the notification queue of the shared memory and a location identifier corresponding to the reader hierarchical state data structure in the reader local storage of the reader;
   in response to determining there is no association of the location identifier of the first notification from the notification queue of the shared memory and a location identifier corresponding to the reader hierarchical state data structure in the reader local storage of the reader, determining to not process the first notification from the notification queue of the shared memory and to proceed to reading a next notification from the notification queue of the shared memory; and
   in response to determining there is an association of the location identifier of the first notification from the notification queue of the shared memory and a location identifier corresponding to the reader hierarchical state data structure in the reader local storage of the reader, determining to remove a copy of the reader entry from the reader object of the reader hierarchical state data structure in the reader local storage of the reader.

15. The non-transitory computer-readable medium of claim 11, further comprising processing notifications of the notification queue of the shared memory with no storage delay.

16. The non-transitory computer-readable medium of claim 11, further comprising:
   reading a second notification from the notification queue of the shared memory, wherein the second notification from the notification queue of the shared memory represents a change made by the writer manager to a second state of a new entry of a child object in the hierarchical state data structure in the shared memory, wherein the new entry of the child object in the hierarchical state data structure in the shared memory is a logical representation of a second state of the system, and wherein the second notification from the notification queue of the shared memory includes a child location identifier of a location of the new entry of the child object in the hierarchical state data structure in the shared memory;
   locating the new entry of the child object in the hierarchical state data structure in the shared memory, wherein the new entry of the child object in the hierarchical state data structure in the shared memory includes a parent location identifier identifying a location of a parent object in the hierarchical state data structure in the shared memory to the child object in the hierarchical state data structure in the shared memory, and wherein the parent object in the hierarchical state data structure in the shared memory holds the location of the new entry of the child object in the hierarchical state data structure in the shared memory; and
   determining the new entry of the child object in the hierarchical state data structure in the shared memory has a corresponding location identifier as a location identifier of a previously-learned entry by the reader, wherein the previously-learned entry corresponds to a different parent object in the hierarchical state data structure in the shared memory, and wherein deletion of the entry of the object in the hierarchical state data structure in the shared memory and creation of the new entry of the child object in the hierarchical state data structure in the shared memory is presumed.

17. A non-transitory computer-readable medium storing executable instructions to cause one or more processing units to perform a method of managing a hierarchical state data structure in a shared memory comprising:
   allocating, by a writer, one or more shared memory buffers of the shared memory, wherein the one or more shared memory buffers of the shared memory are used to store system states of a multi-level hierarchical state data structure, wherein the multi-level hierarchical state data structure is organized into objects of logical representations of changes to the system states of the multi-level hierarchical state data structure, and wherein:
      the one or more shared memory buffers of the shared memory are updated in response to changes to the system states of the multi-level hierarchical state data structure, and
      one or more readers of the shared memory access the multi-level hierarchical state data structure in the shared memory concurrently relative to one another and concurrently relative to the writer;
   creating an object of an entry in the multi-level hierarchical state data structure;
   storing a notification of an allocated shared memory buffer for the entry in a notification queue of the shared memory,
   wherein:
      the storing of the notification of the allocated shared memory buffer for the entry in the notification queue of the shared memory causes the one or more readers of the shared memory to be alerted of a modification, an addition to, or a deletion of the entry in the notification queue of the shared memory; and
   removing, by the writer, the object of the entry in the multi-level hierarchical state data structure and deallocating the allocated shared memory buffer in response to a request for deleting the entry in the multi-level hierarchical state data structure.

18. The non-transitory computer-readable medium of claim 17, wherein the entry in the multi-level hierarchical state data structure includes a metadata field with flags representing a status of the entry in the multi-level hierarchical state data structure, and wherein a flag of the metadata field of the entry in the multi-level hierarchical state data structure is indicative of a valid state of the entry in the multi-level hierarchical state data structure when set and an invalid state of the entry in the multi-level hierarchical state data structure when reset.

19. The non-transitory computer-readable medium of claim 17, wherein the object of the entry in the multi-level hierarchical state data structure represents a current system state and the entry in the multi-level hierarchical state data structure includes a metadata field with flags representing a status of the entry in the multi-level hierarchical state data structure, the method further comprises:
   determining, by a reader of the shared memory, whether or not a first flag of the metadata field is indicative of a valid state of the entry in the multi-level hierarchical state data structure;
   in response to determining the first flag of the metadata field is indicative of the valid state of the entry in the multi-level hierarchical state data structure, determining, by the reader of the shared memory, whether or not a second flag of the metadata field is indicative of the entry in the multi-level hierarchical state data structure being modified; and in response to determining the second flag of the metadata field is indicative of the entry in the multi-level hierarchical state data structure being modified, determining, by the reader of the shared memory, to not process the notification of the allocated shared memory buffer for the entry in the multi-level hierarchical state data structure, and to proceed to reading a next notification from the notification queue of the shared memory.

20. The non-transitory computer-readable medium of claim 19, wherein the multi-level hierarchical state data structure is a multi-level hierarchical state tree.

* * * * *